(12) United States Patent
Bailey

(10) Patent No.: US 11,220,304 B1
(45) Date of Patent: Jan. 11, 2022

(54) SYSTEMS AND METHODS FOR CONTROLLING A LIFT AXLE

(71) Applicant: Norgren GT Development LLC, Auburn, WA (US)

(72) Inventor: Richard Bailey, Auburn, WA (US)

(73) Assignee: Norgren GT Development LLC, Auburn, WA (US)

(*) Notice: Subject to any disclaimer, the term of this patent is extended or adjusted under 35 U.S.C. 154(b) by 0 days.

(21) Appl. No.: 17/130,129

(22) Filed: Dec. 22, 2020

(51) Int. Cl.
*B60G 17/052* (2006.01)
*B62D 61/12* (2006.01)
*B60G 11/27* (2006.01)

(52) U.S. Cl.
CPC ............ *B62D 61/125* (2013.01); *B60G 11/27* (2013.01); *B60G 17/0526* (2013.01); *B60G 17/0528* (2013.01); *B60G 2202/152* (2013.01)

(58) Field of Classification Search
None
See application file for complete search history.

(56) References Cited

U.S. PATENT DOCUMENTS

| | | | |
|---|---|---|---|
| 6,073,947 A | | 6/2000 | Gottschalk et al. |
| 7,959,173 B1* | | 6/2011 | Morroney ............... F15B 13/06 |
| | | | 280/124.157 |
| 9,834,056 B2* | | 12/2017 | Coombs ............... B60G 17/052 |
| 10,428,933 B2* | | 10/2019 | Mills ..................... F15B 13/085 |
| 2002/0117823 A1 | | 8/2002 | Mlsna et al. |
| 2003/0146661 A1* | | 8/2003 | Hatch ..................... F16D 48/02 |
| | | | 303/119.3 |
| 2011/0101257 A1* | | 5/2011 | Morris ............... B60G 17/0525 |
| | | | 251/129.01 |
| 2017/0160753 A1 | | 6/2017 | Paulig et al. |

FOREIGN PATENT DOCUMENTS

KR  10-2012-0056217 A  6/2012
WO  2020/163832 A1  8/2020

OTHER PUBLICATIONS

Search Report prepared by the UK Intellectual Property Office in application No. GB 2101572.2 dated Jul. 7, 2021.

* cited by examiner

*Primary Examiner* — Faye M Fleming
(74) *Attorney, Agent, or Firm* — McDonnell Boehnen Hulbert & Berghoff LLP

(57) ABSTRACT

An example method includes receiving, at a first frequency, sensor information indicative of an actual pressure level of a pilot fluid signal in a pilot line connecting an outlet port of a pilot supply valve to a pilot port of a main valve; determining an estimated pressure for the pilot fluid signal in the pilot line at a second frequency greater than the first frequency; determining a pressure estimate error based on comparing the actual pressure level to the estimated pressure; determining a pressure level error based on comparing the estimated pressure to a commanded pressure value; and operating the pilot supply valve in an open state to provide the pilot fluid signal to the pilot port of the main valve until the pressure level error is less than a threshold value.

20 Claims, 12 Drawing Sheets

1300

```
┌─────────────────────────────────────────────────────────────┐
│ RECEIVING, BY A CONTROLLER OF A VALVE ASSEMBLY, SENSOR      │
│ INFORMATION INDICATIVE OF AN ACTUAL PRESSURE LEVEL OF A PILOT│
│ FLUID SIGNAL IN A PILOT LINE, WHEREIN THE CONTROLLER RECEIVES│
│ THE SENSOR INFORMATION AT A FIRST FREQUENCY, WHEREIN THE    │
│ VALVE ASSEMBLY COMPRISING A PILOT SUPPLY VALVE HAVING (I) A │
│ VALVE INLET PORT CONFIGURED TO BE FLUIDLY COUPLED TO A      │
│ SOURCE OF FLUID, AND (II) AN OUTLET PORT CONFIGURED TO BE   │
│ FLUIDLY COUPLED TO A PILOT PORT OF A MAIN VALVE VIA THE PILOT│
│ LINE, WHEREIN WHEN THE PILOT SUPPLY VALVE IS OPERATING IN AN│
│ OPEN STATE, THE PILOT FLUID SIGNAL FLOWS FROM THE VALVE INLET│
│ PORT TO THE OUTLET PORT TO ACTUATE THE MAIN VALVE           │
└─────────────────────────────────────────────────────────────┘ 1302
                              │
                              ▼
┌─────────────────────────────────────────────────────────────┐
│ DETERMINING AN ESTIMATED PRESSURE FOR THE PILOT FLUID SIGNAL│
│ IN THE PILOT LINE AT A SECOND FREQUENCY GREATER THAN THE    │
│                      FIRST FREQUENCY                        │
└─────────────────────────────────────────────────────────────┘ 1304
                              │
                              ▼
┌─────────────────────────────────────────────────────────────┐
│ DETERMINING A PRESSURE ESTIMATE ERROR BASED ON COMPARING    │
│ THE ACTUAL PRESSURE LEVEL TO THE ESTIMATED PRESSURE         │
└─────────────────────────────────────────────────────────────┘ 1306
                              │
                              ▼
┌─────────────────────────────────────────────────────────────┐
│ DETERMINING A PRESSURE LEVEL ERROR BASED ON COMPARING THE   │
│ ESTIMATED PRESSURE TO A COMMANDED PRESSURE VALUE            │
└─────────────────────────────────────────────────────────────┘ 1308
                              │
                              ▼
┌─────────────────────────────────────────────────────────────┐
│ OPERATING THE PILOT SUPPLY VALVE IN THE OPEN STATE UNTIL THE│
│ PRESSURE LEVEL ERROR IS LESS THAN A THRESHOLD VALUE         │
└─────────────────────────────────────────────────────────────┘ 1310
```

FIG. 13

OPERATING THE PILOT EXHAUST VALVE IN A CLOSED STATE TO BLOCK FLUID FLOW FROM THE SECOND OUTLET PORT TO THE VENT PORT TO ALLOW THE PILOT FLUID SIGNAL TO FLOW TO THE PILOT PORT OF THE MAIN VALVE TO ACTUATE THE MAIN VALVE — 1700

FIG. 17

SENDING A SIGNAL TO A SOLENOID COIL OF THE PILOT SUPPLY VALVE AT THE SECOND FREQUENCY — 1800

FIG. 18

GENERATING AN ENABLE SIGNAL IN RESPONSE TO OPERATING THE PILOT SUPPLY VALVE IN THE OPEN STATE, WHEREIN DETERMINING THE ESTIMATED PRESSURE IS ENABLED BASED ON THE ENABLE SIGNAL MEETING AN ENABLEMENT CRITERION — 1900

FIG. 19

SYSTEMS AND METHODS FOR CONTROLLING A LIFT AXLE

BACKGROUND

Some vehicles, such as trucks, have multiple axles with two or four tires per axle to spread the weight over the road surface. There is a maximum weight per type of axle, and therefore, to carry heavy weights, trucks have multiple axles. However, when the truck or trailer is empty, the weight might not sufficient to justify using all the axles.

A retractable axle or lift axle of a truck is an axle that can be raised when the truck is not carrying a heavy load or is empty so that its tires are not touching the road surface. This improves fuel economy, reduces maintenance, and reduces tire wear. When the vehicle is carrying higher loads, the axle can be lowered so that its tires are touching the road surface and the axle can carry load to facilitate distributing the load among a larger number of axles.

The retractable axle can be lowered and retracted using a fluid system. Such a fluid system can involve using a valve assembly to direct fluid to and from actuating mechanisms that can lower and retract the axle. It may be desirable to configure the valve assembly in a modular manner to facilitate controlling one or more retractable axles as desired based on the type and size of the truck.

Each vehicle or vehicle type may have different configuration parameters (e.g., different hose lengths and sizes), which can affect operation of the control system of the valve assembly. In an example, the configuration parameters of the vehicle can be hard-coded or manually input to a controller for each vehicle. However, this can be cumbersome and might not take into consideration changes that might occur after the configuration parameters are input.

It may thus be desirable to have a control system that can automatically identify or compensate for variations in the configuration parameters, and thus adapt to the configuration of the vehicle without having to hard code the control parameters into the controller. This way, the controller can compensate for any changes in the configuration parameters and can control any vehicle or vehicle type regardless of configuration. It is with respect to these and other considerations that the disclosure made herein is presented.

SUMMARY

The present disclosure describes implementations that relate to systems and methods for controlling a lift axle.

In a first example implementation, the present disclosure describes a control system. The control system includes a valve assembly comprising a pilot supply valve having (i) a valve inlet port configured to be fluidly coupled to a source of fluid, and (ii) an outlet port configured to be fluidly coupled to a pilot port of a main valve via a pilot line, wherein when the pilot supply valve is operating in an open state, a pilot fluid signal flows from the valve inlet port to the outlet port to actuate the main valve. The control system also includes a controller configured to perform operations comprising: (i) receiving, at a first frequency, sensor information indicative of an actual pressure level of the pilot fluid signal in the pilot line, (ii) determining an estimated pressure for the pilot fluid signal in the pilot line at a second frequency greater than the first frequency, (iii) determining a pressure estimate error based on comparing the actual pressure level to the estimated pressure, (iv) determining a pressure rate scalar based on the pressure estimate error, wherein determining the estimated pressure is based on the pressure rate scalar, (v) determining a pressure level error based on comparing the estimated pressure to a commanded pressure value, and (vi) operating the pilot supply valve in the open state until the pressure level error is less than a threshold value.

In a second example implementation, the present disclosure describes a vehicle. The vehicle includes (i) a retractable axle; (ii) axle-lowering bags configured to lower the retractable axle of the vehicle when inflated; (iii) a source of fluid; (iv) a main valve comprising: (a) a supply port fluidly coupled to the source of fluid, (b) a workport fluidly coupled to the axle-lowering bags, and (c) a pilot port; (v) a pilot supply valve having (a) a valve inlet port fluidly coupled to the source of fluid, and (b) an outlet port, wherein when the pilot supply valve is operating in an open state, the outlet port is fluidly coupled to the valve inlet port and a pilot fluid signal flows from the valve inlet port to the outlet port; (vi) a pilot line fluidly coupling the outlet port of the pilot supply valve to the pilot port of the main valve; (vii) a pressure sensor coupled to the pilot line and configured to provide, at a first frequency, sensor information indicative of an actual pressure level of the pilot fluid signal in the pilot line; (viii) a vehicle control unit configured to receive the sensor information from the pressure sensor and generate a commanded pressure value for the pilot fluid signal. The vehicle also includes a controller configured to perform operations comprising: (i) receiving the sensor information and the commanded pressure value from the vehicle control unit, (ii) determining an estimated pressure for the pilot fluid signal in the pilot line at a second frequency greater than the first frequency, (iii) determining a pressure estimate error based on comparing the actual pressure level to the estimated pressure, (iv) determining a pressure rate scalar based on the pressure estimate error, wherein determining the estimated pressure is based on the pressure rate scalar, (v) determining a pressure level error based on comparing the estimated pressure to the commanded pressure value, and (vi) operating the pilot supply valve in the open state until the pressure level error is less than a threshold value, thereby actuating the main valve, causing the supply port to be fluidly coupled to the workport and allowing the axle-lowering bags to be inflated.

In a third example implementation, the present disclosure describes a method. The method includes: (i) receiving, by a controller of a valve assembly, sensor information indicative of an actual pressure level of a pilot fluid signal in a pilot line, wherein the controller receives the sensor information at a first frequency, wherein the valve assembly comprising a pilot supply valve having (a) a valve inlet port configured to be fluidly coupled to a source of fluid, and (b) an outlet port configured to be fluidly coupled to a pilot port of a main valve via the pilot line, wherein when the pilot supply valve is operating in an open state, the pilot fluid signal flows from the valve inlet port to the outlet port to actuate the main valve; (ii) determining an estimated pressure for the pilot fluid signal in the pilot line at a second frequency greater than the first frequency; (iii) determining a pressure estimate error based on comparing the actual pressure level to the estimated pressure; (iv) determining a pressure level error based on comparing the estimated pressure to a commanded pressure value; and (v) operating the pilot supply valve in the open state until the pressure level error is less than a threshold value.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 13 is a flowchart of a method associated with a control system of a retractable axle, in accordance with an example implementation.

FIG. 17 is a flowchart of additional operations that are executable with the method FIG. 13, in accordance with an example implementation.

FIG. 18 is a flowchart of additional operations that are executable with the method FIG. 13, in accordance with an example implementation.

FIG. 19 is a flowchart of additional operations that are executable with the method FIG. 13, in accordance with an example implementation.

DETAILED DESCRIPTION

Vehicles, such as some dump trucks and trailers, may be configured with a retractable axle (also referred to as a lift or drop axle), which may be mechanically raised or lowered. The axle is lowered to increase the weight capacity, or to distribute the weight of the cargo over more wheels. When not needed, the axle is lifted off the ground to save wear on the tires and axle, and to increase traction in the remaining wheels. The terms "lift," "retract," and "raise" an axle are used interchangeably herein. Similarly, the terms "lower" and "deploy" an axle are used interchangeably herein.

Figure 1:
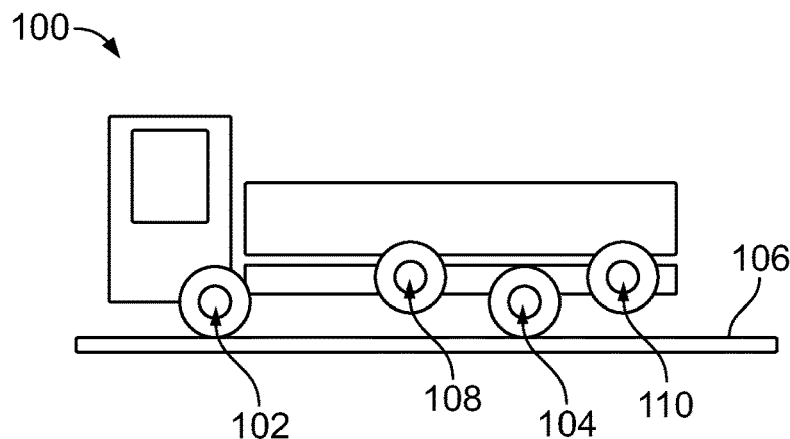
FIG. 1 illustrates a vehicle having retractable axles, in accordance with an example implementation.

FIG. 1 illustrates a vehicle 100 having retractable axles, in accordance with an example implementation. The vehicle 100 has a front axle 102 and a rear axle 104 having respective wheels that permanently contact a road surface 106. The vehicle 100 also has a first retractable axle 108 and a second retractable axle 110 that can be raised and lowered based on the weight that the vehicle 100 is carrying. For example, in FIG. 1, the vehicle 100 might not be carrying cargo, and therefore both retractable axles 108, 110 are raised off the road surface 106 (i.e., their wheels do not contact the road surface 106 and the retractable axles 108, 110 are not carrying weight). When the vehicle 100 is loaded with cargo, one or both of the retractable axles 108, 110 can be lowered to distribute the weight of the cargo over more wheels.

Figure 2:
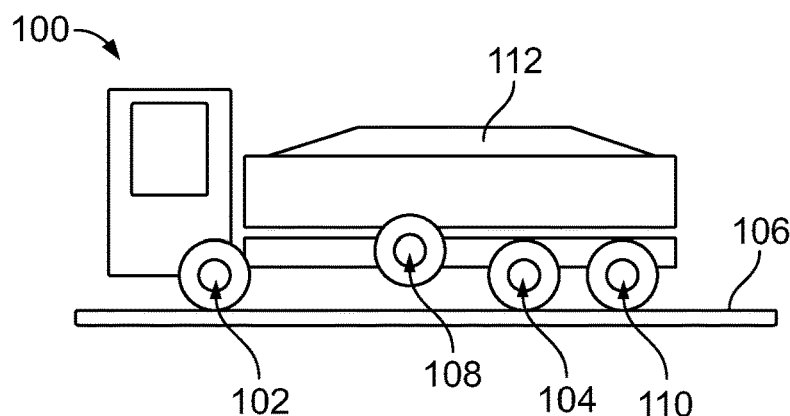
FIG. 2 illustrates the vehicle of FIG. 1 with a retractable axle lowered, in accordance with an example implementation.

FIG. 2 illustrates the vehicle 100 with the retractable axle 110 lowered, in accordance with an example implementation. If the vehicle 100 is loaded with a cargo 112 having a medium weight, one of the retractable axles 108, 110 is lowered to distribute the weight of the cargo 112 between three axles (the front axle 102, the rear axle 104, and the retractable axle 110), rather than two axles.

Figure 3:
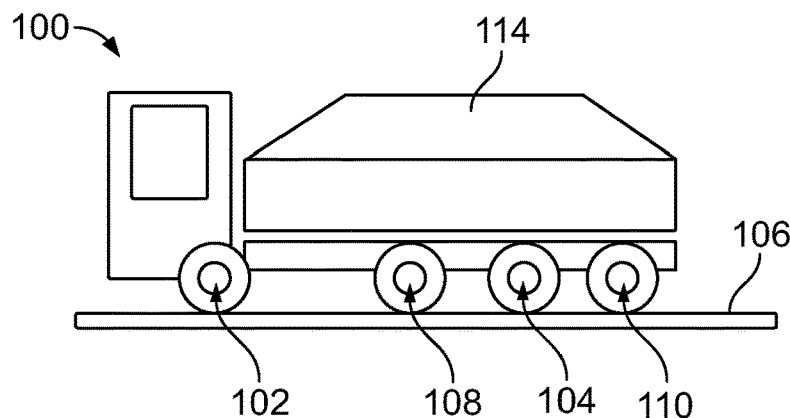
FIG. 3 illustrates the vehicle of FIG. 1 with two retractable axles lowered, in accordance with an example implementation.

FIG. 3 illustrates the vehicle 100 with both the retractable axle 108 and the retractable axle 110 lowered, in accordance with an example implementation. If the vehicle 100 is loaded with a cargo 114 having a large weight, both of the retractable axles 108, 110 are lowered to distribute the weight of the cargo 114 between four axles (the front axle 102, the rear axle 104, and the retractable axles 108, 110), rather than two or three axles.

The configuration shown in FIGS. 1-3 is an example configuration and is not meant to be limiting. For instance, in some vehicles, three retractable axles can be used. In another example, a truck may have only one retractable axle. Further the location of the retractable axles can vary. For instance, while the rear axle 104 is interposed between the retractable axles 108, 110, in other examples, the retractable axles 108, 110 can be interposed between the front axle 102 and the rear axle 104.

Several mechanisms can be used to lift and lower the retractable axles 108, 110. For example, the vehicle 100 can have a fluid system to lower and raise the retractable axles 108, 110. The term "fluid" is used herein generally to indicate air, gas, liquid, hydraulic fluid, water, etc. In the description below, air is used as an example; however, it should be understood that the valves and system described herein may also be used with other fluid types.

Figure 4:
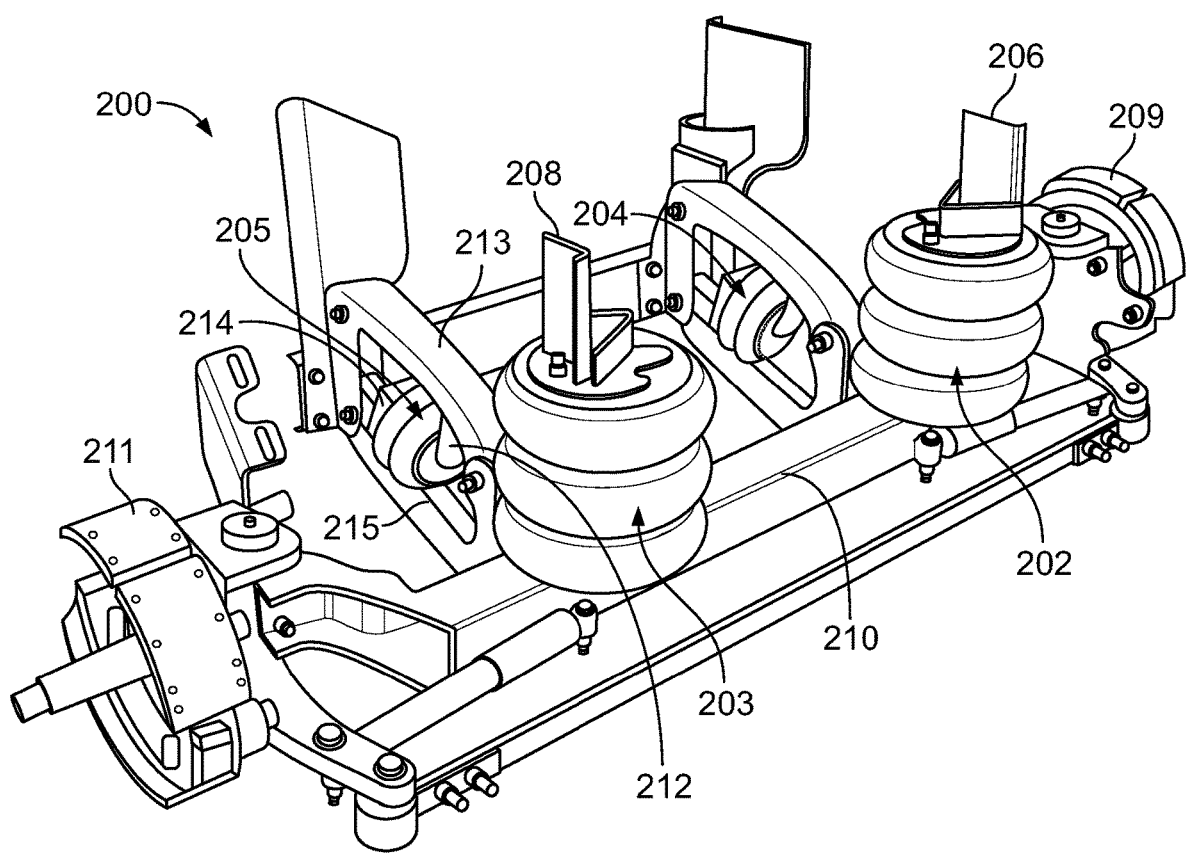
FIG. 4 illustrates a perspective view of a retractable axle assembly, in accordance with an example implementation.

FIG. 4 illustrates a perspective view of a retractable axle assembly 200, in accordance with an example implementation. The wheels of the retractable axle assembly 200 are not shown to reduce visual clutter in the drawing.

In the example implementation of FIG. 4, the retractable axle assembly 200 includes a first set of axle-lowering bags 202 and a second set of axle-lowering bags 203. The retractable axle assembly 200 also includes a first set of axle-lifting bags 204 and a second set of axle-lifting bags 205. The bags can be referred to as airbags or airsprings when compressed air is used to inflate and deflate the bags.

Upper ends of the axle-lowering bags 202, 203 are respectively coupled to mounting members 206, 208. Lower ends of the axle-lowering bags 202, 203 are respectively coupled to a retractable axle 210. The retractable axle 210 represents the retractable axle 108 or the retractable axle 110 of the vehicle 100, for example. Wheels hubs 209, 211 are coupled to the retractable axle 210 for attaching wheels (not shown).

The mounting members 206, 208 can be secured to a frame of the vehicle 100. With this configuration, upper ends of the axle-lowering bags 202, 203 are fixed to the frame of the vehicle 100, while the lower ends thereof can move up and down with the retractable axle 210 based on the inflation state of the axle-lowering bags 202, 203.

One end of the axle-lifting bags 205 is coupled to a rigid member 212, which is coupled to support member 213, which in turn is coupled to a frame of the vehicle 100. The other end of the axle-lifting bags 205 is coupled to a pivot member 214, which is coupled to the retractable axle 210 via member 215. The axle-lifting bags 204 are configured similarly.

With this configuration, inflating the axle-lowering bags 202, 203 while deflating the axle-lifting bags 204, 205 lowers the retractable axle 210. On the other hand, inflating the axle-lifting bags 204, 205 while deflating the axle-lowering bags 202, 203 raises or lifts the retractable axle 210.

Figure 5A:
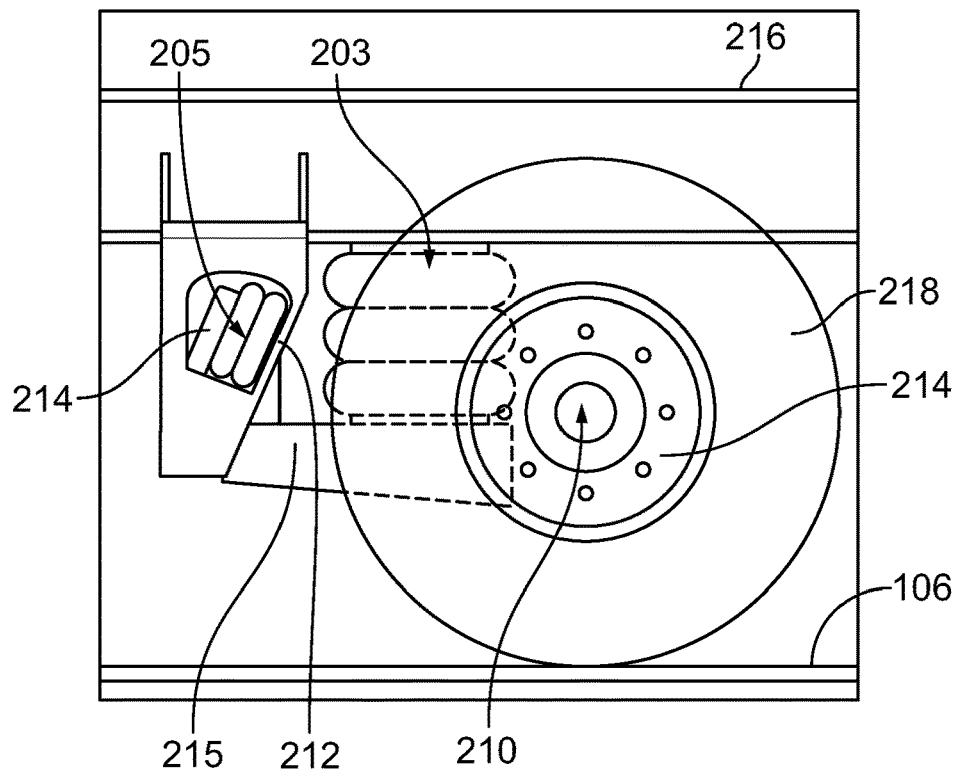
FIG. 5A illustrates an axle in a lowered position, in accordance with an example implementation.
Figure 5B:
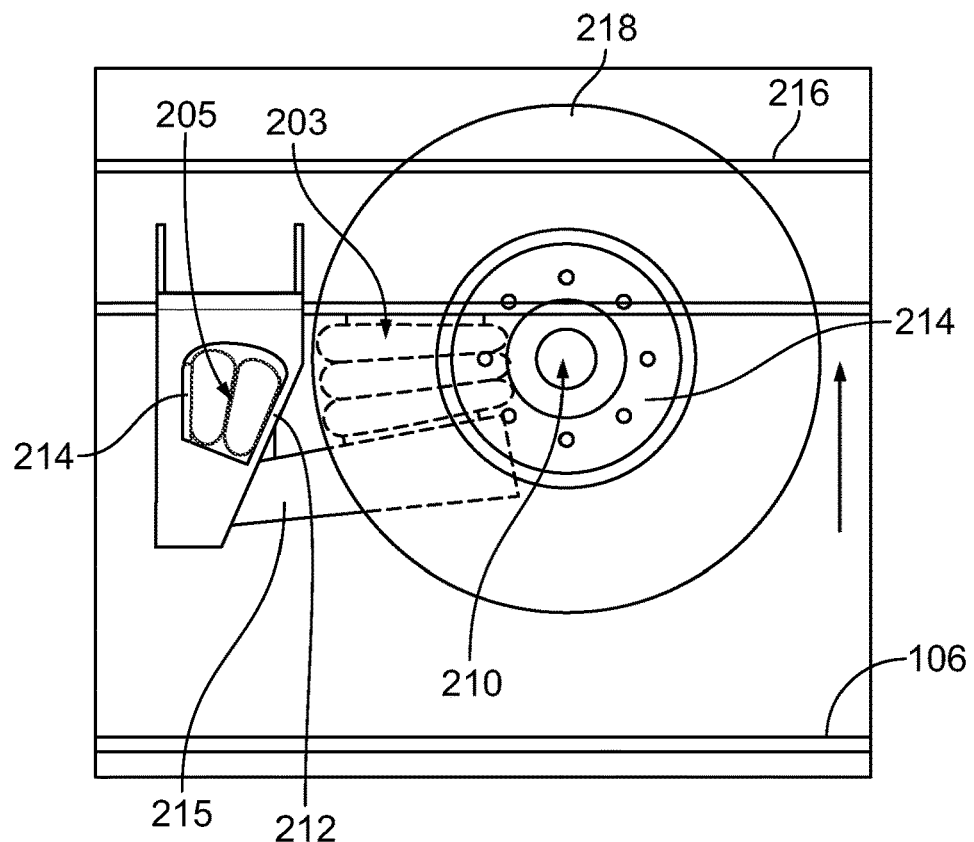
FIG. 5B illustrates an axle in a lifted position, in accordance with an example implementation.

FIG. 5A illustrates the retractable axle 210 in a lowered position, and FIG. 5B illustrates the retractable axle 210 in a lifted position, in accordance with an example implementation. Particularly, FIG. 5A illustrates the axle-lowering bags 203 being inflated, whereas the axle-lifting bags 205 are deflated. When the axle-lowering bags 203 is inflated, the retractable axle 210 is lowered because the upper end of the axle-lowering bags 203 is fixedly attached to a frame 216, while its lower end is coupled to the retractable axle 210. As such, a wheel 218 coupled to the wheel hub 211 is lowered to contact the road surface 106.

FIG. 5B illustrates the axle-lowering bags 203 being deflated, whereas the axle-lifting bags 205 are inflated. When the axle-lifting bags 205 are inflated, they push the pivot member 214, which rotates counter-clockwise, causing the member 215 to also rotate, lifting the retractable axle 210 and the wheel 218 off the road surface 106.

The vehicle 100 includes a fluid system that provides fluid (e.g., air) to the bags to inflate them and exhaust fluid from the bags to deflate them. For example, the vehicle 100 can include an electronic controller, and a driver of the truck can provide an input (e.g., via a button) to the controller indicating a request to raise or lower the retractable axle 210. Responsively, the controller provides electric signals to valves of the fluid system to direct fluid to or exhaust fluid from the bags. In another example, the controller can automatically determine whether to deploy the retractable axle 210 based on measuring the weight of the cargo of the vehicle 100.

Figure 6:
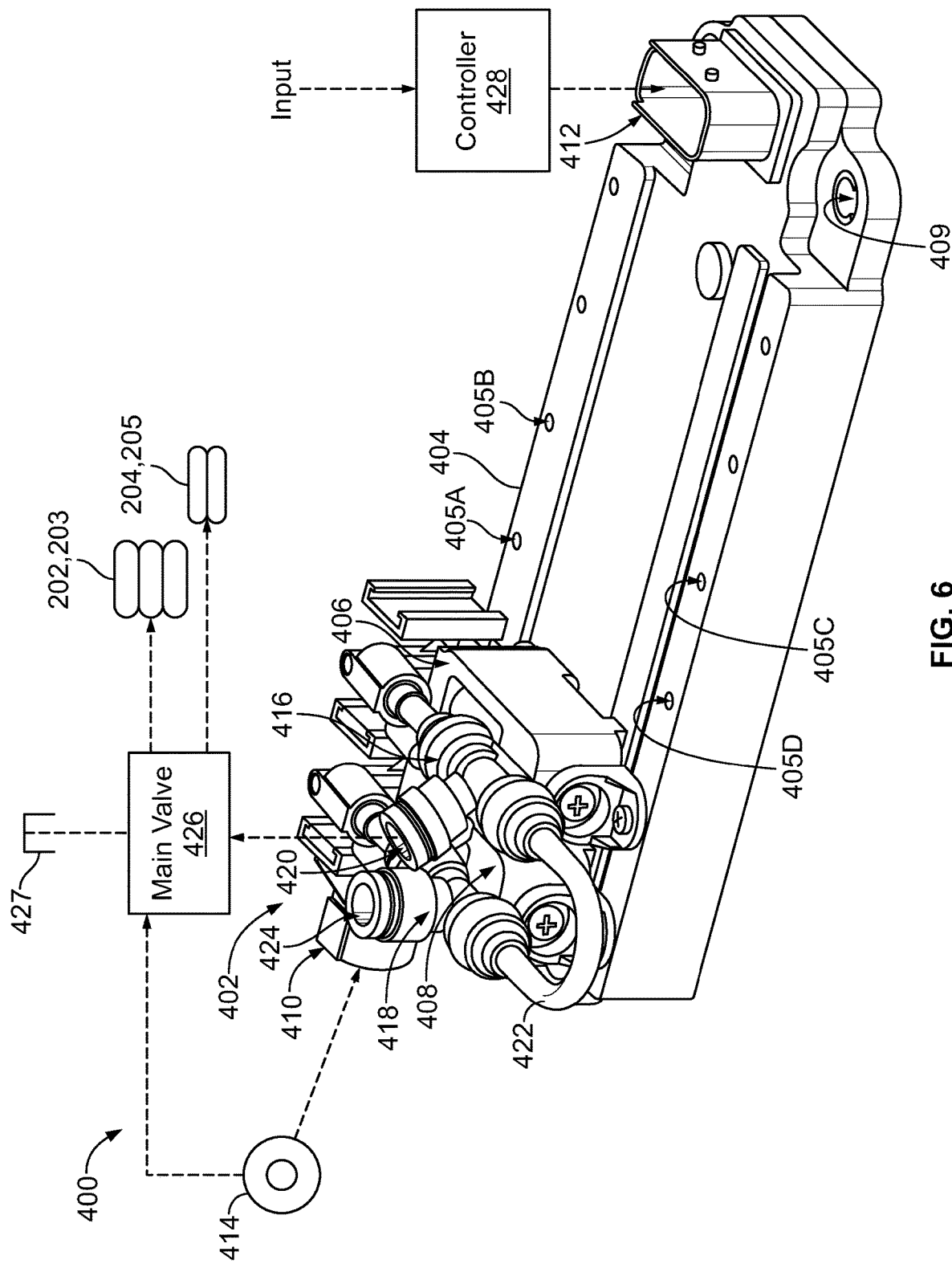
FIG. 6 illustrates a system including a valve assembly for controlling a retractable axle, in accordance with an example implementation.

FIG. 6 illustrates a system 400 including a valve assembly 402 for controlling a retractable axle, in accordance with an example implementation. For example, the system 400 and the valve assembly 402 can control lifting and lowering of the retractable axle 210 (which represents the retractable axles 108, 110).

The valve assembly 402 includes a mounting plate 404. The mounting plate 404 can also be referred to as a manifold. The mounting plate 404 includes a plurality of valve mounting holes, such as valve mounting holes 405A, 405B, 405C, 405D, disposed in two opposite rows. Each two opposite valve mounting holes facilitate mounting a pilot valve to the mounting plate 404, such as pilot supply valve 406 and pilot exhaust valve 408, via respective fasteners.

The mounting plate 404 also includes vehicle mounting holes, such as vehicle mounting hole 409. The vehicle mounting holes facilitate attaching the mounting plate 404 and the valve assembly 402 to the vehicle 100 via respective fasteners disposed through the vehicle mounting holes.

The mounting plate 404 also includes an inlet fitting 410. The inlet fitting 410 is coupled to an inlet port of the mounting plate 404 to facilitate providing inlet fluid through an inlet channel within the mounting plate 404 (see FIG. 18).

The mounting plate 404 further includes an electric connector 412. The electric connector 412 includes multiple pins and is configured to receive an electric plug to provide and receive electric signals. The mounting plate 404 can further include a printed circuit board (PCB) therein or electric wires that electrically connect the pins of the electric connector 412 to electric terminals of the pilot supply valve 406 and the pilot exhaust valve 408.

The system 400 includes a source 414 of fluid that is fluidly coupled to the inlet fitting 410, which is coupled to the inlet port of the mounting plate 404. The source 414 can, for example, be a pump, air compressor, an accumulator, etc. The fluid from the source 414 is communicated via the inlet fitting 410 to the inlet port of the mounting plate 404, and then to inlet ports of the pilot supply valves (e.g., the pilot supply valve 406) coupled to the mounting plate 404.

The valve assembly 402 includes a supply fitting 416 coupled to an outlet port of the pilot supply valve 406. The valve assembly 402 also includes and an exhaust fitting 418 coupled to an outlet port of the pilot exhaust valve 408. The supply fitting 416 has a pilot supply port 420, and the pilot supply valve 406 is configured to provide a pilot fluid signal through the pilot supply port 420.

As depicted in FIG. 6, the supply fitting 416 and the exhaust fitting 418 are fluidly coupled via a fluid line or hose 422 such that the outlet ports of the pilot supply valve 406 and the pilot exhaust valve 408 are fluidly coupled. The exhaust fitting 418 has a port 424 that can be coupled to a pressure sensor, for example, to provide an indication of a pressure level of the pilot fluid signal. The term "fluidly coupled" is used throughout herein to indicate that fluid can flow or be communicated between two fluid passages, chambers, ports, or openings.

The system 400 includes a main valve 426 that is configured to supply fluid to, and receive fluid from, the axle-lowering bags 202, 203 and the axle-lifting bags 204, 205. In an example, as described in more detail below with respect to FIGS. 9-10, the main valve 426 is configured as a directional control valve that is pilot-actuated via the pilot fluid signal from the pilot supply valve 406.

Based on the actuation state of the main valve 426, the main valve 426 allows fluid flow from the source 414 therethrough to inflate the axle-lowering bags 202, 203 or the axle-lifting bags 204, 205. The main valve 426 also allows for deflation of the axle-lowering bags 202, 203 or the axle-lifting bags 204, 205 by allowing fluid from the axle-lowering bags 202, 203 or the axle-lifting bags 204, 205 therethrough to a reservoir 427 of fluid. In examples, the reservoir 427 represents the atmosphere or the external environment of the vehicle 100.

The system 400 further includes a controller 428 that is configured to provide electric signals to the electric connector 412 based on input signals (e.g., operator commands or commands from a main controller of a vehicle). For example, an operator may press a button to lower or lift an axle, and an input signal is thus provided to the controller 428, which operates the valve assembly 402 to lift or lower the axle. In another example, the controller 428 (or a vehicle control unit of the vehicle 100) may automatically determine based on the weight of the cargo whether deploying a retractable axle is required, and accordingly provide an input signal to the controller 428 to operate the valve assembly 402.

The controller 428 is an electronic controller that includes one or more processors or microprocessors and may include data storage (e.g., memory, transitory computer-readable medium, non-transitory computer-readable medium, etc.). The data storage may have stored thereon instructions that, when executed by the one or more processors of the controller 428, cause the controller 428 to perform the operations described herein. Further, the controller 428 can include several software and/or hardware modules performing different operations at different frequencies as described below with respect to FIGS. 11-12.

The system 400 and the mounting plate 404 are configured to be modular so as to accommodate one or more retractable axles based on the type and configuration of the vehicle (e.g., the truck). For example, a truck can include one, two, or three retractable axles. As such, the system 400 and the manifold can accommodate a number of valves depending on the number of retractable axles.

Figure 7:
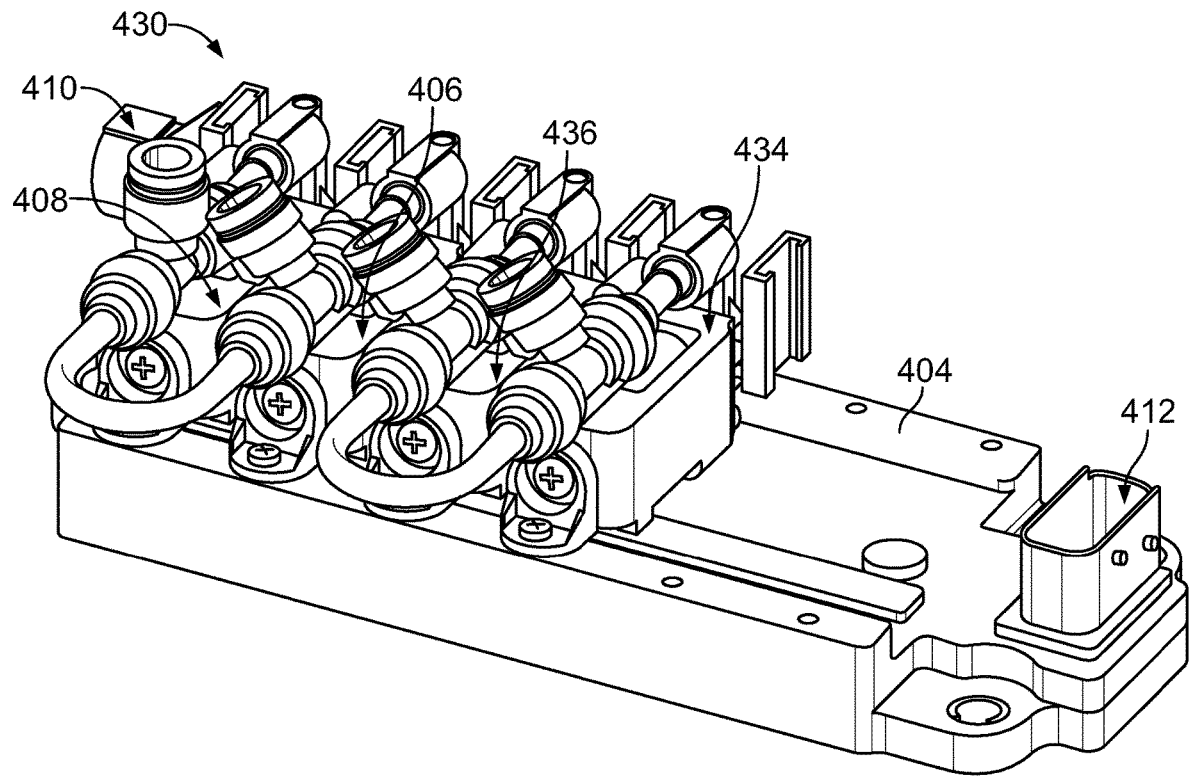
FIG. 7 illustrates a valve assembly configured to control two retractable axles, in accordance with an example implementation.
Figure 8:
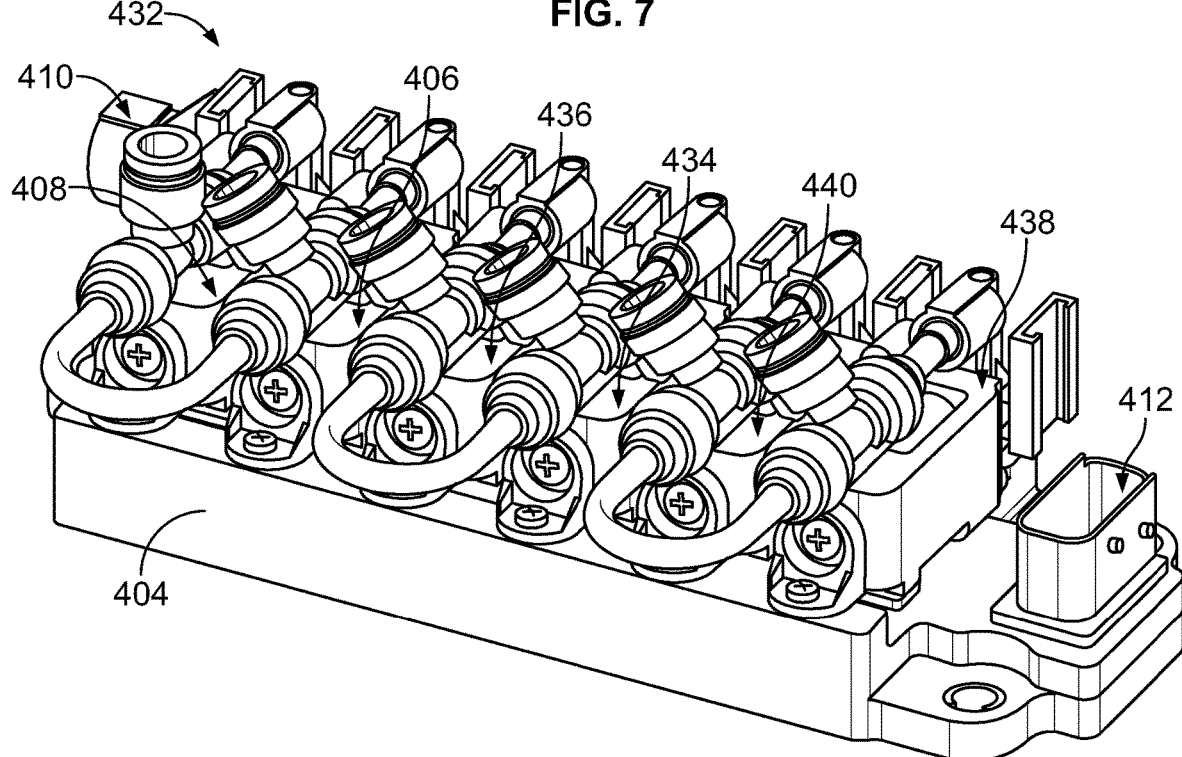
FIG. 8 illustrates a valve assembly configured to control three retractable axles, in accordance with an example implementation.

FIG. 7 illustrates a valve assembly 430 configured to control two retractable axles, and FIG. 8 illustrate a valve assembly 432 configured to control three retractable axles, in accordance with example implementations. As shown in FIG. 7, in addition to the pilot supply valve 406, another pilot supply valve 434 is mounted to the mounting plate 404. Also, in addition to the pilot exhaust valve 408, another pilot exhaust valve 436 is mounted to the mounting plate 404. The pilot supply valve 434 and the pilot exhaust valve 436 are configured to control a respective main valve (similar to the main valve 426) to control inflation and deflation of respective axle-lowering bags and axle-lifting bags of a second retractable axle.

In FIG. 8, another pilot supply valve 438 and another pilot exhaust valve 440 are mounted to the mounting plate 404. The pilot supply valve 438 and the pilot exhaust valve 440 are configured to control a respective main valve (similar to the main valve 426) to control inflation and deflation of respective axle-lowering bags and axle-lifting bags of a third retractable axle.

The pilot supply valves 406, 434, 438 and the pilot exhaust valves 408, 436, 440 can be configured as any type of two-position, two-way valve or two-position, three-way valve, for example. Each of the pilot supply valves 406, 434, 438 and the pilot exhaust valves 408, 436, 440 can have a solenoid coil that, when energized, cause a movable element (e.g., spool, piston, or poppet) with the respective pilot valve to move to a particular position to operate the respective pilot valve in a particular state.

Operations of the system 400 to inflate and deflate the axle-lowering bags 202, 203 and the axle-lifting bags 204, 205 are described next with respect to one retractable axle and one set of pilot valves (the pilot supply valve 406 and the pilot exhaust valve 408). However, it should be understood that operating other retractable axles and other pilot valves if the vehicle 100 has more than one retractable axle is similar.

Figure 9:
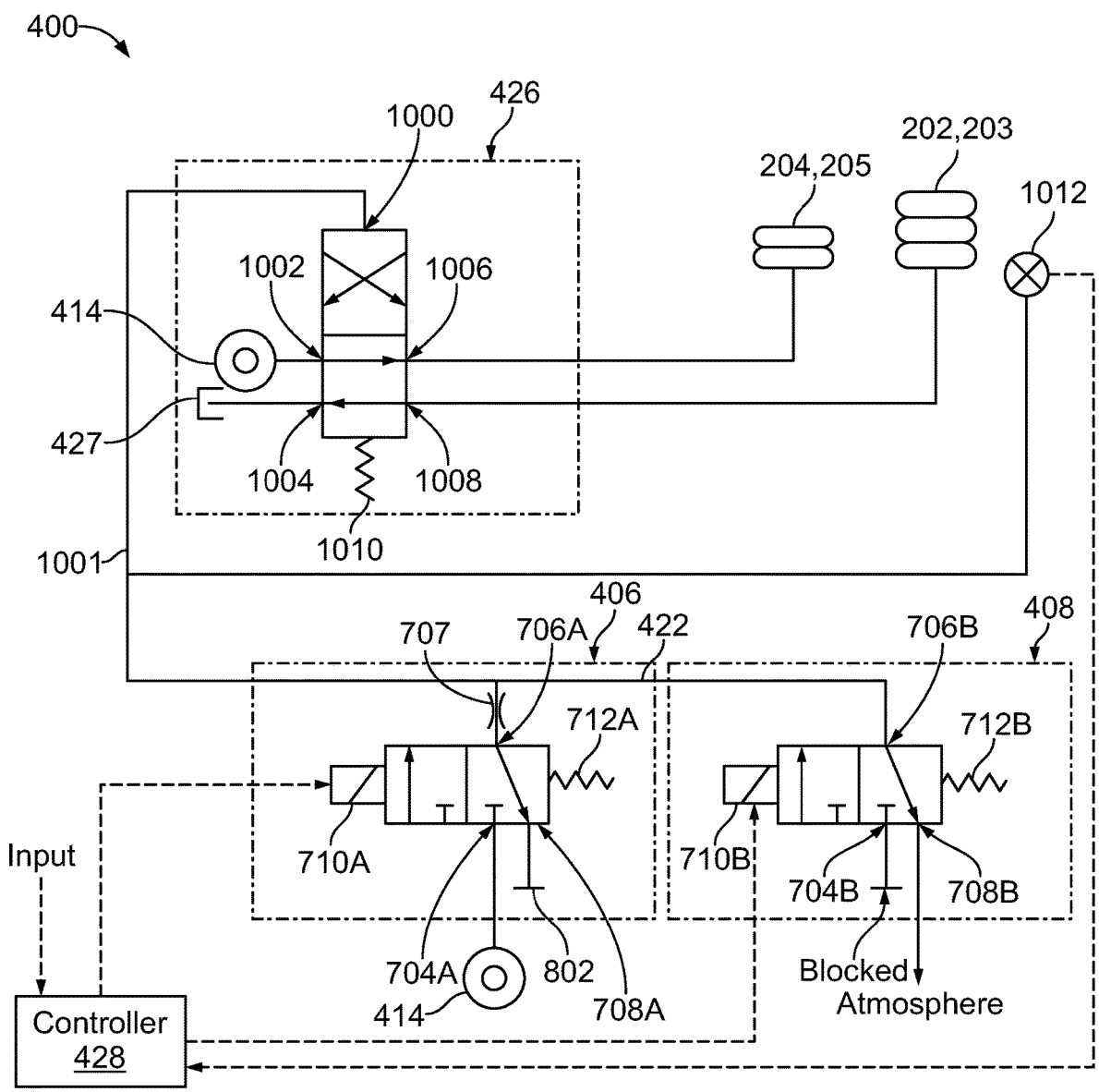
FIG. 9 illustrates a schematic diagram of the system of FIG. 6 in an axle-lifting state, in accordance with an example implementation.

FIG. 9 illustrates a schematic diagram of the system 400 in an axle-lifting state, in accordance with an example implementation. Components of the system 400 are depicted symbolically in FIG. 9. Components of the pilot supply valve 406 are designated with reference numbers and an "A" suffix, and components of the pilot exhaust valve 408 are designated with the same reference numbers used for the pilot supply valve 406 with a "B" suffix, instead.

The pilot supply valve 406 has a valve inlet port 704A, which is fluidly coupled to the source 414 of fluid (e.g., through the inlet port and inlet fitting 410 of the mounting plate 404). The pilot supply valve 406 also has an outlet port 706A to which the supply fitting 416 is coupled. The outlet port 706A is configured to be fluidly coupled via the supply fitting to a pilot line 1001 and the hose 422.

In an example, a restriction 707 can be disposed within the supply fitting 416 downstream from the outlet port 706A. The restriction 707 can, for example, be an orifice (e.g., 0.02" size orifice). The restriction 707 can operate as a damper that enhances control of pressure level of the pilot fluid signal provided to the main valve 426.

In an example where the pilot supply valve 406 is a three-way valve, the pilot supply valve 406 can have a vent port 708A. However, the vent port 708A can be blocked by a plug 802 to operate the pilot supply valve 406 as a two-way valve.

The pilot supply valve 406 is configured to be electrically-actuated. Particularly, the pilot supply valve 406 has a solenoid coil 710A that is electrically coupled to the controller 428 (e.g., via a wire or a communication bus).

When the controller 428 sends an electric signal with a particularly polarity to the solenoid coil 710A, the solenoid coil 710A is energized and a magnetic field is generated. The magnetic field cause a solenoid force to be applied to a moving element (e.g., armature, plunger, spool, piston, poppet, etc.) within the pilot supply valve 406 causing the moving element to shift in a first direction against the biasing force of a spring 712A. As a result, the pilot supply valve 406 can operate in a first state (shown in FIG. 10) that can be referred to as the open state. When the controller 428 sends no electric signal to the solenoid coil 710A (or sends a signal with an opposite polarity), the spring 712A biases the moving element back in a second direction to operate the pilot supply valve 406 in the state shown in FIG. 9, which can be referred to as the closed state.

The pilot exhaust valve 408 is configured similar to the pilot supply valve 406. However, the valve inlet port 704B of the pilot exhaust valve 408 is blocked and is not connected to the source 414 of fluid. On the other hand, the vent port 708B of the pilot exhaust valve 408 is exposed to an environment of the pilot exhaust valve 408 (e.g., exposed to the atmosphere). As mentioned above, the outlet port 706B of the pilot exhaust valve 408 is fluidly coupled to the outlet port 706A of the pilot supply valve 406 via the hose 422.

The pilot exhaust valve 408 also has a solenoid coil 710B, similar to the solenoid coil 710A, electrically coupled to the controller 428. When the controller 428 sends an electric signal with a particularly polarity to the solenoid coil 710B, the solenoid coil is energized and a solenoid force to be applied to a moving element (e.g., armature, plunger, spool, piston, poppet, etc.) within the pilot exhaust valve 408 causing the moving element to move in a first direction against the biasing force of a spring 712B. As a result, the pilot exhaust valve 408 can operate in a respective closed state (shown in FIG. 10) in which the outlet port 706B is fluidly decoupled from the vent port 708B. When the controller 428 sends no electric signal to the solenoid coil 710B (or sends a signal with an opposite polarity), the spring 712B biases the moving element back in a second direction to operate the pilot exhaust valve 408 in a respective open state shown in FIG. 9 in which the outlet port 706B is fluidly coupled to the vent port 708B.

As depicted, the main valve 426 can be configured as a pilot-operated directional control valve. Particularly, as symbolically indicated in FIG. 9, the main valve 426 can be a four-way, two-position valve. The main valve 426 can have a pilot port 1000 fluidly coupled via the pilot line 1001 (e.g., a hose) to the outlet ports 706A, 706B of the pilot supply valve 406 and the pilot exhaust valve 408, respectively. As mentioned above with respect to FIG. 6, the outlet ports 706A, 706B of the pilot supply valve 406 and the pilot exhaust valve 408 are fluidly coupled to each other via the hose 422.

The pilot supply valve 406 and the pilot exhaust valve 408 are configured to control the pilot fluid signal to the pilot port 1000 of the main valve 426, which then controls fluid flow to and from the axle-lowering bag 202, 203 and the axle-lifting bags 204, 205. Particularly, the main valve 426 has (i) a supply port 1002 that is fluidly coupled to the source 414 of fluid, (ii) a reservoir port 1004 that is fluidly coupled to the reservoir 427, (iii) a first workport 1006 that is fluidly coupled to the axle-lifting bags 204, 205, and (iv) a second workport 1008 that is fluidly coupled to the axle-lowering bags 202, 203. The source 414 of fluid is drawn in two locations in FIG. 9 to reduce visual clutter but it should be understood that the system 400 can include one source of fluid providing pressurized fluid (e.g., compressed air) to the main valve 426 and the pilot supply valve 406 via respective fluid passages.

The main valve 426 can have a movable element (e.g., a spool, piston, or poppet) therein that is shiftable within a valve body of the main valve 426 to direct fluid flow to and from the first workport 1006 and the second workport 1008 based on a state of the main valve 426. The movable element of the main valve 426 can be biased to the state shown in FIG. 9 via a biasing element such as a spring 1010. If, however, a pilot fluid signal having a sufficient pressure level is provided to the pilot port 1000, the movable element of the main valve 426 can shift against the biasing force of the spring 1010 to operate the main valve 426 in an actuated state (shown in FIG. 10).

The controller 428 can receive an input indicating a request to retract the retractable axle 210. For instance, an operator of the vehicle 100 may press a button to provide the input to the controller 428 or a vehicle control unit may provide to the controller 428 input information indicating that the retractable axle 210 is not needed.

In order to lift the retractable axle 210, the controller 428 operates the pilot supply valve 406 and the pilot exhaust valve 408 in a manner that causes the axle-lifting bags 204, 205 to be inflated. Particularly, to inflate or fill the axle-lifting bags 204, 205 to lift the retractable axle 210, the controller 428 causes both the pilot supply valve 406 and the pilot exhaust valve 408 to operate in a first state shown in FIG. 9 (e.g., the controller 428 can provide no signal to the solenoid coils 710A, 710B or provide signal with a given polarity to allow the springs 712A, 712B to bias the movable elements). In the first state, the outlet port 706A of the pilot supply valve 406 is not fluidly coupled to the valve inlet port 704A, but is rather fluidly coupled to the vent port 708A, which is blocked by the plug 802. Therefore, the first state of the pilot supply valve 406 can be referred to as the closed state where no pilot fluid signal is provided to the outlet port 706A.

Also, the outlet port 706B of the pilot exhaust valve 408 is fluidly coupled to the vent port 708B, thereby draining or venting the pilot port 1000 of the main valve 426 to the atmospheric environment of the vehicle 100. As such, the pilot port 1000 has low pressure (e.g., atmospheric pressure) fluid and the spring 1010 biases the movable element of the main valve 426, causing the main valve 426 to operate in the unactuated state depicted in FIG. 9.

In the state of the main valve 426 depicted in FIG. 9 (the spring-biased state or unactuated state), the supply port 1002 is fluidly coupled to the first workport 1006, which is fluidly coupled to the axle-lifting bags 204, 205. As such, fluid from the source 414 flows through the main valve 426 to the axle-lifting bags 204, 205, causing them to inflate. At the same time, the reservoir port 1004 is fluidly coupled to the second workport 1008, which is fluidly coupled to the axle-lowering bags 202, 203. As such, fluid from the axle-lowering bags 202, 203 is drained or exhausted through the main valve 426 to the reservoir 427, causing them to deflate. As a result of inflating the axle-lifting bags 204, 205 and deflating the axle-lowering bags 202, 203, the retractable axle 210 is lifted off the road surface 106.

Figure 10:
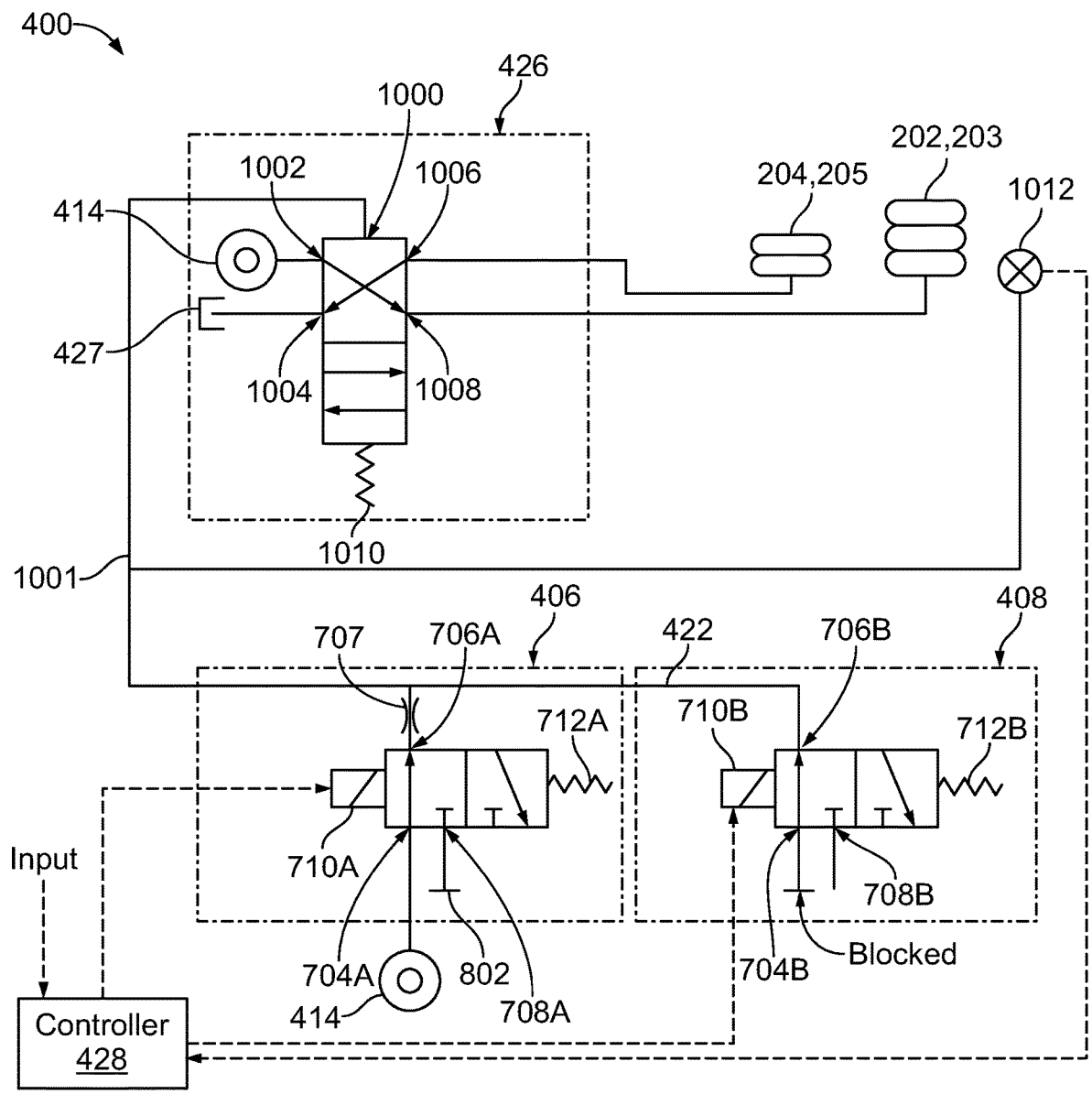
FIG. 10 illustrates a schematic diagram of the system of FIG. 6 in an axle-lowering state, in accordance with an example implementation.

FIG. 10 illustrates a schematic diagram of the system 400 in an axle-lowering state, in accordance with an example implementation. The controller 428 can receive an input indicating a request to lower the retractable axle 210. For instance, an operator of the vehicle 100 may press a button to provide an input to the controller 428 indicating a request to lower the retractable axle 210, or the controller 428 receives input information from the vehicle control unit indicating that the retractable axle 210 is to be deployed to distribute the weight among a larger number of axles.

In order to lower the retractable axle 210, the controller 428 operates the pilot supply valve 406 and the pilot exhaust valve 408 in a manner that causes the axle-lowering bags 202, 203 to be inflated. Particularly, to inflate or fill the axle-lowering bags 202, 203 to lower the retractable axle 210, the controller 428 causes both the pilot supply valve 406 and the pilot exhaust valve 408 to operate in a second state (e.g., the controller 428 can provide a signal with a particular polarity to the solenoid coils 710A, 710B to move the respective moving elements against the biasing force of the springs 712A, 712B). In the second state shown in FIG. 10, the valve inlet port 704A of the pilot supply valve 406 is fluidly coupled to the outlet port 706A, and therefore fluid from the source 414 flows to the outlet port 706A. Therefore, the second state can be referred to as the open state where the pilot fluid signal is provided from the source 414 through the valve inlet port 704A to the outlet port 706A.

The valve inlet port 704B of the pilot exhaust valve 408 is blocked and also the vent port 708B is blocked when the movable element moves to a particular position as a result of the signal from the controller 428. As such, a pilot fluid signal is provided from the outlet port 706A of the pilot supply valve 406 through the pilot line 1001 to the pilot port 1000 of the main valve 426. Pressure level of the pilot fluid signal can increase until it overcomes the biasing force of the spring 1010, thereby shifting the movable element of the main valve 426 and causing the main valve 426 to operate in the actuated state depicted in FIG. 10.

In the state of the main valve 426 depicted in FIG. 10 (the actuated state), the supply port 1002 is fluidly coupled to the second workport 1008, which is fluidly coupled to the axle-lowering bags 202, 203. As such, fluid from the source 414 flows through the main valve 426 to the axle-lowering bags 202, 203, causing them to inflate. At the same time, the reservoir port 1004 is fluidly coupled to the first workport 1006, which is fluidly coupled to the axle-lifting bags 204, 205. As such, fluid from the axle-lifting bags 204, 205 is drained or exhausted through the main valve 426 to the reservoir 427, causing them to deflate. As a result of inflating the axle-lowering bags 202, 203 and deflating the axle-lifting bags 204, 205, the retractable axle 210 is lowered such that the wheels contact the road surface 106 and the retractable axle 210 supports the weight of the vehicle 100 and its cargo with other axles of the vehicle 100.

The controller 428 can keep the pilot supply valve 406 in the second state (i.e., the open state) shown in FIG. 10 (i.e., providing the pilot pressure signal) for a particular period of time until the pressure level in the pilot line 1001 reaches or exceeds a threshold pressure value (e.g., 150 psi) that is sufficient to shift the movable element of the main valve 426. Once the main valve 426 is actuated to the state shown in FIG. 10, the pilot supply valve 406 can be switched back to the first state (e.g., by the controller 428 not sending a signal or sending a signal of opposite polarity such that the spring 712A biases a movable element of the pilot supply valve 406 to operate it in the closed state of FIG. 9).

However, the controller 428 maintains the pilot exhaust valve 408 operating in the second state shown in FIG. 10 such that the pilot port 1000 is not drained to the reservoir or atmosphere. Rather, the outlet port 706B is blocked. This way, pressure level in the pilot line 1001 coupling the outlet ports 706A, 706B is maintained and the main valve 426 remains in the actuated state. When it is desired to lift the retractable axle 210, then the controller 428 sends a signal with the second polarity to the solenoid coil 710B to operate the pilot exhaust valve 408 in the state as shown in FIG. 9 to drain the pilot port 1000 and operate the main valve 426 in the unactuated state.

The particular period of time during which the controller 428 keeps the pilot supply valve 406 operating in the open state shown in FIG. 10 can vary based on several factors. For example, a first factor is a fluid capacitance of the pilot line 1001 and any other fluid lines, manifolds, volumes, in the fluid path between the outlet port 706A and the pilot port 1000 of the main valve 426.

The capacitance of the pilot line 1001 is based on its length, diameter, and material, for example. The rate of change of pressure level in the pilot line 1001 when the pilot supply valve 406 is in the open state (providing the pilot fluid signal to the main valve 426) is inversely proportional to the capacitance of the pilot line 1001. The larger the capacitance, the longer it is going to take to build up or increase the pressure level of the pilot fluid signal at the pilot port 1000 and vice versa.

Based on the size and type of the vehicle 100, the length of the pilot line 1001 can vary. As such, the capacitance can vary substantially from one vehicle to another. Therefore, for different vehicles, the controller 428 keeps the pilot supply valve 406 operating in the open state for respectively different periods of time. The length of the pilot line 1001 or other configuration parameters indicative of the fluid capacitance between the pilot supply valve 406 and the main valve 426 can be hard-coded or manually input for each vehicle configuration, such that the period of time is set for each vehicle.

However, such manual inputting or hard coding is cumbersome, and it may be desirable for the controller 428 to automatically change or adapt the period of time during which the pilot supply valve 406 provides the pilot fluid signal regardless of the vehicle configuration. In other words, it may be desirable to have the controller 428 identify or compensate for any variations in the capacitance.

Further, it may be desirable for the controller 428 to implement a closed-loop feedback control scheme to control pressure level of the pilot fluid signal. Particularly, the controller 428 can receive a target or command pressure level to be achieved at the pilot port 1000 of the main valve 426. Thus, the system 400 can further include a pressure sensor 1012 shown in FIGS. 9-10 configured to provide sensor information indicative of the actual pressure level in the pilot line 1001 to the controller 428, and the controller 428 then seeks to reduce the discrepancy or error between the target and actual pressure levels.

In an example, the controller 428 can be operating at a high frequency, such as a 100 Hz, i.e., the controller 428 receives inputs and provides command signals every 10 milliseconds (ms). Also, pressure level of the pilot line 1001 can be varying substantially within short periods of time, e.g., within 10 ms. On the other hand, the pressure sensor 1012 providing sensor information indicative of the actual pressure level of the pilot fluid signal may be providing sensor information at a lower frequency, e.g., 20 Hz. It may thus be desirable for the controller 428 to estimate pressure level variations between data points provided by the pressure sensor 1012 due to the high rate of change with which actual pressure level changes.

Figure 11:
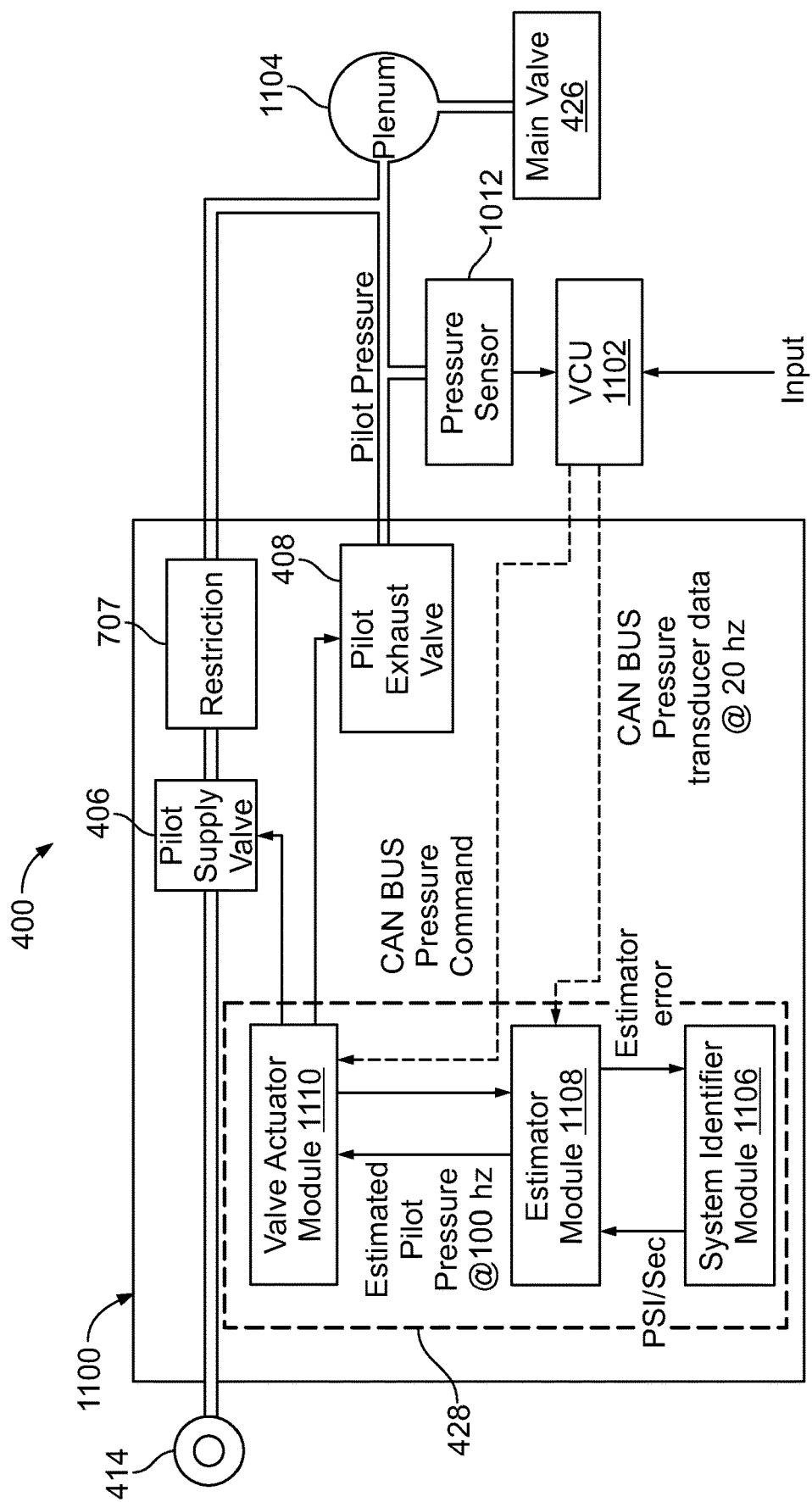
FIG. 11 illustrates a block diagram of a control system of a retractable axle, in accordance with an example implementation.

FIG. 11 illustrates a block diagram of a control system 1100 of the retractable axle 210, in accordance with an example implementation. The control system 1100 can for example be included in the system 400 described above.

The system 400 includes the source 414, the main valve 426, the pressure sensor 1012, a vehicle control unit (VCU) 1102, a plenum 1104, and the control system 1100. The VCU 1102 can be another electronic controller that operates as a master control unit for the vehicle 100, for example. The VCU 1102 communicates with the controller 428 of the control system 1100 via wires or a communication bus, e.g., a Controller Area Network bus (CAN bus). In another example, the controller 428 can be included in the VCU 1102.

Particularly, the pressure sensor 1012 provides sensor information indicative of pressure level of the pilot fluid signal to the VCU 1102 and the VCU 1102 provides the sensor information to the controller 428. The VCU 1102 also provides to the controller 428 a command pressure indicative of a desired or target pressure level to be achieved for the pilot fluid signal to actuate the main valve 426. The controller 428 then controls the pilot supply valve 406 and the pilot exhaust valve 408 to achieve the target pressure level for the pilot fluid signal.

The plenum 1104 represents fluid capacitance in the system 400 between the pilot supply valve 406, the pilot exhaust valve 408 and the main valve 426. For example, the plenum 1104 represents fluid lines (e.g., hoses) connecting the pilot supply valve 406 and the pilot exhaust valve 408 to the main valve as well as any volumes in manifolds, chambers, or boxes therebetween. As a specific example, the plenum 1104 represents the pilot line 1001.

The size of the plenum 1104 can vary from one vehicle to another. For example, the length of the pilot line 1001 can vary from 5 feet long to 30 feet long based on the size and type of the vehicle and its configuration. The rate of change of pressure level of the pilot fluid signal provided to the main valve 426 is based on the fluid capacitance of the plenum 1104. Particularly, the rate of change of pressure level of the pilot fluid signal is inversely proportional to the fluid capacitance of the plenum 1104. As such, the period of time during which the pilot supply valve 406 remains open, providing the pilot fluid signal to the main valve 426, increases as the fluid capacitance increases as it might take more time to build up or increase the pressure level of the pilot fluid signal to the target pressure level.

The control system 1100 includes the controller 428, the pilot supply valve 406, with the restriction 707 at the outlet port 706A of the pilot supply valve 406, and the pilot exhaust valve 408. The controller 428 includes various control modules including a system identifier module 1106, an estimator module 1108, and a valve actuator module 1110. Such control modules are examples of software components that may be implemented to control operation of the pilot supply valve 406 and the pilot exhaust valve 408 to achieve the target pressure level of the pilot fluid signal.

In particular, the valve actuator module 1110 is configured to implement a closed-loop feedback control scheme to control how long to open the pilot supply valve 406 and achieve the target pressure level before shutting the pilot supply valve 406 off. The system identifier module 1106 is configured to compensate for, or adapt to, variations in the size of the plenum 1104 from one vehicle to another without having to hard code the size of the plenum 1104.

The estimator module 1108 is configured to estimate pressure level of the pilot fluid signal at a higher frequency than the frequency with which the pressure sensor 1012 provides its sensor information. For instance, the pressure sensor 1012 may be providing sensor information at a frequency of 20 Hz (i.e., provides a data point or measurement every 50 ms). On the other hand, the valve actuator module 1110 may be operating at a higher frequency, such as a 100 Hz (e.g., provides a command signal to the solenoid coil 710A every 10 ms). As such, there is a 40 ms gap during which the valve actuator module 1110 does not receive updates for the actual pressure level of the pilot fluid signal. The pressure level of the pilot fluid signal may be changing much faster than the 20 Hz frequency of the pressure sensor 1012 and may thus be changing during the 40 ms gap. It may thus be desirable to estimate the pressure level during the time gap, and the estimator module 1108 implements operations that estimate the pressure level at a higher frequency, e.g., at the same 100 Hz frequency of the valve actuator module 1110.

Figure 12:
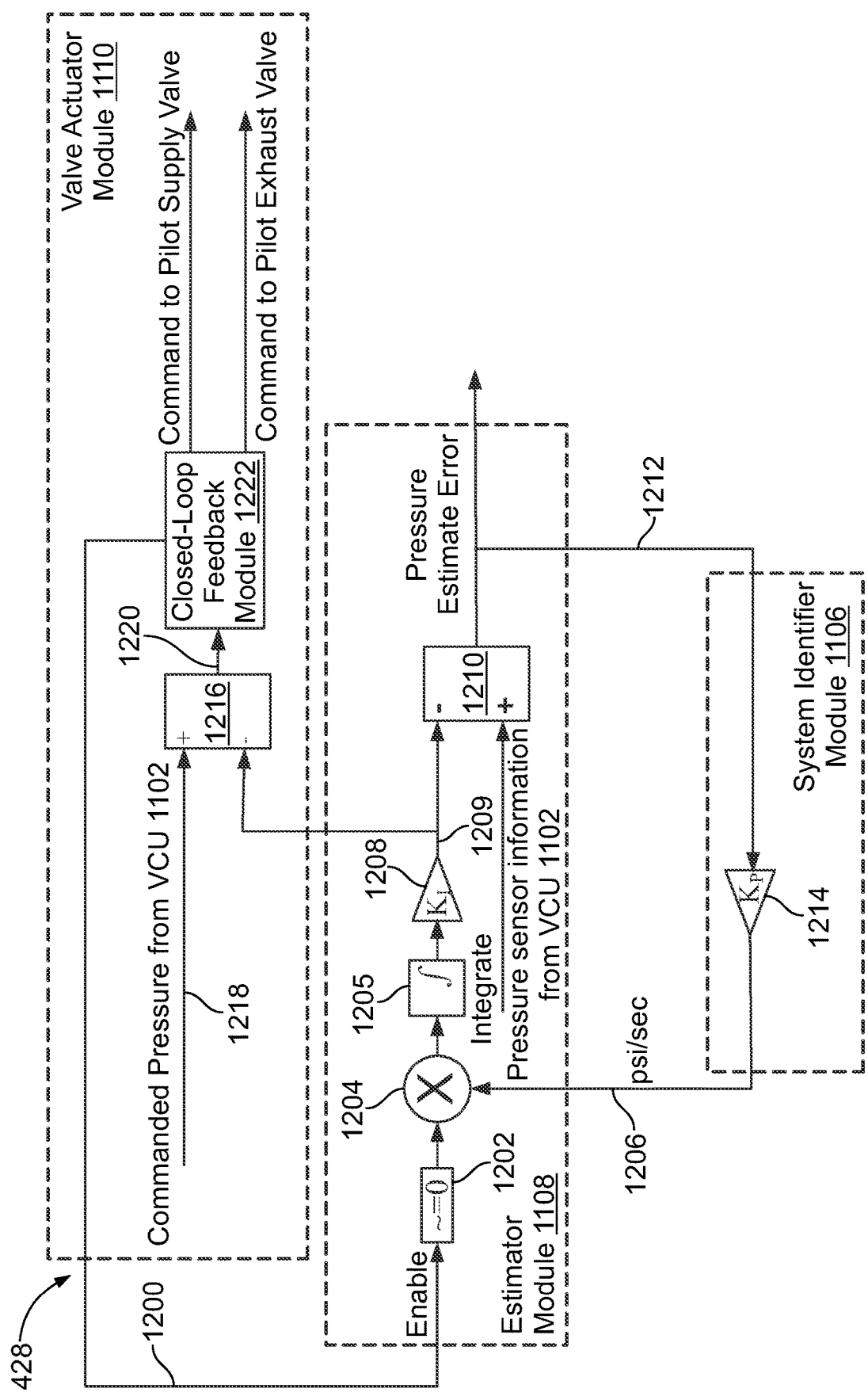
FIG. 12 illustrates a block diagram of modules of a controller of a retractable axle, in accordance with an example implementation.

FIG. 12 illustrates a block diagram of modules of the controller 428, in accordance with an example implementation. As mentioned above, the estimator module 1108 is configured to estimate the actual pressure level of the pilot fluid signal at a higher frequency (e.g., 100 Hz) based on the pressure sensor information from the VCU 1102, which receives the sensor information from the pressure sensor 1012 at a lower frequency (e.g., 20 Hz).

In an example, the estimator module 1108 receives an enable signal 1200 from the valve actuator module 1110 indicating whether the pilot supply valve 406 or the pilot exhaust valve 408 are open or actuated. If either (or both) of the pilot supply valve 406 or the pilot exhaust valve 408 is open, the enable signal 1200 causes the estimator module 1108 to estimate the pressure level and provide it to the valve actuator module 1110. If both the pilot supply valve 406 and the pilot exhaust valve 408 are not actuated or open, the enable signal 1200 disables the estimator module 1108 or causes the estimator module 1108 to not send the estimate to the valve actuator module 1110.

As an example for illustration, if either of the pilot supply valve 406 or the pilot exhaust valve 408 is open, the enable signal 1200 can have a value of 1, and if both the pilot supply valve 406 and the pilot exhaust valve 408 are not actuated, the enable signal 1200 can have a value of 0. At block 1202, estimator module 1108 determines whether the enable signal 1200 meets an enable threshold or enablement criterion. For instance, if the value of the enable signal 1200 is 1 or other non-zero value, then the block 1202 produces a value of 1. If the value of the enable signal 1200 is zero, then the block 1202 produces a value of 0.

At multiplier block 1204, the estimator module 1108 multiplies the value of the enable signal 1200 with a pressure rate scalar 1206 provided by the system identifier module 1106. For example, the pressure rate scalar 1206 can indicate an estimated rate of change of pressure level in pounds per square inch (psi) per second (psi/sec).

At integration block 1205, the pressure rate scalar 1206 is integrated over time to accumulate the value of the increase or decrease of the actual pressure level over time in the time gap (e.g., 40 ms) between rate at which the information is provided by the pressure sensor 1012 and the higher rate at which the valve actuator module 1110 processes information. The result of the integration block 1205 is then multiplied by an integral gain $K_I$ at gain block 1208. In an example, the $K_I$ can have a value of 1, such that the result of the integration passes as generated by the integration block 1205. The result of the gain block 1208 is an estimated pressure 1209.

At difference block 1210, the estimator module 1108 compares the estimated pressure 1209 to the value of actual pressure level provided by the pressure sensor 1012 through the VCU 1102. The difference between the estimated pressure 1209 and the actual pressure level indicated by the pressure sensor 1012 is a pressure estimate error 1212 that is fed to the system identifier module 1106.

As mentioned above, the system identifier module 1106 is configured to compensate for, or adapt to, variations in the size of the plenum 1104 (e.g., the length of the pilot line 1001) from one vehicle or configuration to another. For example, in a vehicle where the pilot line 1001 is long (e.g., 30 feet long hose), it will take more time to build pressure in the pilot line 1001 to a target pressure level. In other words, the rate of change of pressure level in the 1001 would be smaller than in a vehicle where the pilot line 1001 is shorter (e.g., 5 feet long hose).

The system identifier module 1106 is configured to multiply the pressure estimate error 1212 by a gain $K_P$ at gain block 1214 to generate the pressure rate scalar 1206 in psi/sec, which is then integrated (error accumulation) at the integration block 1205 of the estimator module 1108 as described above. This way, the pressure estimate error 1212 is amplified by the gain block 1214.

In an example, the gain $K_P$ is greater than 1 such that the pressure rate scalar 1206 goes up or down in value by a percentage of the pressure estimate error 1212. For example, if $K_P$ is 1.2, the pressure rate scalar 1206 is an amplification of the pressure estimate error 1212 by 20%. As such, the pressure rate scalar 1206 is a value that is based on a magnitude of the pressure estimate error 1212 multiplied by the gain $K_P$. The larger the pressure estimate error 1212, the larger the pressure rate scalar 1206 in psi/sec.

With this configuration, when the pilot supply valve 406 is open (e.g., the enable signal 1200 is positive), the estimator module 1108 estimates the pressure level at a higher frequency and compares the estimated pressure 1209 to the actual pressure level to generate the pressure estimate error 1212. If the estimated pressure 1209 is less than the actual pressure level and the pressure estimate error 1212 is a large positive value, then the pressure rate scalar 1206 is increased due to amplification of the pressure estimate error 1212 at the gain block 1214. The pressure rate scalar 1206, now increased, gets integrated and accumulated at the integration block 1205 to cause the estimated pressure 1209 to rapidly increase to become closer in value to the actual pressure value. The pressure rate scalar 1206 decreases as the estimated pressure 1209 becomes closer in value to the actual pressure value and the pressure estimate error 1212 decreases.

This way, the size of the plenum 1104 does not need to be hard-coded into the controller 428. Rather, the controller 428 automatically calibrates itself and changes the value of the pressure rate scalar 1206 to adapt to any system configuration parameters (e.g., any plenum size). Regardless of the size of the plenum 1104, the system identifier module 1106 identifies the value of the pressure rate scalar 1206 that reduces or eliminates the pressure estimate error 1212.

Thus, beneficially, the controller 428 can be installed into any vehicle with any configuration, then the controller 428 may identify the value of the pressure rate scalar 1206 that is appropriate for the particular vehicle without manual calibration. In other words, there is no need to perform manual calibration to identify the size of the plenum 1104 and hard code it into the controller 428.

Further, as depicted in FIG. 12, the estimated pressure 1209 is provided to the valve actuator module 1110. Particularly, at difference block 1216, the valve actuator module 1110 compares the estimated pressure 1209 to a commanded pressure value 1218 provided by the VCU 1102. The commanded pressure value 1218 is the desired or target pressure level to be achieved by the pilot supply valve 406 to actuate the main valve 426. The difference between the estimated pressure 1209 and the commanded pressure value 1218 is a pressure level error 1220 that is fed to a closed-loop feedback module 1222 in the valve actuator module 1110.

The closed-loop feedback module 1222 is configured to implement a closed-loop feedback control system to reduce the pressure level error 1220. The closed-loop feedback module 1222 can be configured as a proportional-integral (PI) closed-loop feedback controller, proportional-integral-differential (PID), bang-bang, etc.

Particularly, based on the pressure level error 1220, the closed-loop feedback module 1222 generates the command signal to the pilot supply valve 406 and maintains the command signal to the pilot supply valve 406 until achieving the commanded pressure value 1218 that actuates the main valve 426. For example, as long as the pressure level error 1220 is greater than a threshold value (e.g., greater than 5 psi), the valve actuator module 1110 maintains the pilot supply valve 406 open. The valve actuator module 1110 also provides the enable signal 1200 to the estimator module 1108 as long as the pilot supply valve 406 is open as described above. Once the pressure level error 1220 is less than the threshold value (e.g., less than 5 psi), which indicates that the commanded pressure value 1218 is achieved or substantially achieved, the valve actuator module 1110 closes the pilot supply valve 406. The valve actuator module 1110 also disables the estimator module 1108, e.g., by not sending the enable signal 1200 or sending the enable signal 1200 with a zero value.

The valve actuator module 1110 provides the commanded signal to the pilot supply valve 406 at a frequency that is greater than the frequency with which the pressure sensor 1012 provides its sensor information. For example, if the vehicle 100 has one retractable axle, the valve actuator module 1110 provides the commanded signal to the pilot supply valve 406 at the same frequency with which the estimator module 1108 generates the estimated pressure 1209 (e.g., 100 Hz). If the vehicle 100 has more retractable axles, the valve actuator module 1110 provides the commanded signal to the pilot supply valve 406 at a frequency that is greater than the frequency with which the pressure sensor 1012 provides its sensor information but smaller than the frequency with which the estimator module 1108 generates the estimated pressure 1209.

For instance, assuming the valve actuator module 1110 provides one command signal every 10 ms (i.e., at a 100 Hz frequency), if the vehicle 100 has three retractable axles, the valve actuator module 1110 provides commanded signals to the pilot supply valves 406, 434, 438 sequentially with one command to a respective pilot supply valve every 10 ms. As such, each pilot supply valve receives a command signal approximately every 30 ms, i.e., at a frequency of 33 Hz.

The control system 1100 operations are described above with respect to operating the pilot supply valve 406 and actuating the main valve 426, as an example. Similar operations are used to operate the pilot exhaust valve 408 when it is desired to unactuate the main valve 426 and drain the pilot port 1000.

FIG. 13 is a flowchart of a method 1300 associated with a control system of a retractable axle, in accordance with an example implementation. The method 1300 can, for example, be performed by the controller 428 of the control system 1100 to control the retractable axle 210.

The method 1300 may include one or more operations, or actions as illustrated by one or more of blocks 1300-1310, 1400, 1500, 1600, 1700, 1800, and 1900. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 1300 and other processes and operations disclosed herein, the flowchart shows operation of one possible implementation of present examples. In this regard, each block may represent a module, a segment, or a portion of program code, which includes one or more instructions executable by a processor (e.g., a processor or microprocessor of the controller 428) for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 1300 and other processes and operations disclosed herein, one or more blocks in FIGS. 13-19 may represent circuitry or digital logic that is arranged to perform the specific logical operations in the process.

At block 1302, the method 1300 includes receiving, by the controller 428 of a valve assembly (e.g., the valve assembly 402), sensor information indicative of an actual pressure level of a pilot fluid signal in the pilot line 1001, wherein the controller 428 receives the sensor information at a first frequency (e.g., 20 Hz), wherein the valve assembly comprising the pilot supply valve 406 having (i) the valve inlet port 704A configured to be fluidly coupled to the source 414 of fluid, and (ii) the outlet port 706A configured to be fluidly coupled to the pilot port 1000 of the main valve 426 via the pilot line 1001, wherein when the pilot supply valve 406 is operating in an open state (see FIG. 10), the pilot fluid signal flows from the valve inlet port 704A to the outlet port 706A to actuate the main valve 426.

At block 1304, the method 1300 includes determining the estimated pressure 1209 for the pilot fluid signal in the pilot line 1001 at a second frequency (e.g., 100 Hz) greater than the first frequency.

At block 1306, the method 1300 includes determining the pressure estimate error 1212 based on comparing (e.g., comparing at the difference block 1210) the actual pressure level to the estimated pressure 1209.

At block 1308, the method 1300 includes determining the pressure level error 1220 based on comparing (e.g., at the difference block 1216) the estimated pressure 1209 to the commanded pressure value 1218.

At block 1310, the method 1300 includes operating the pilot supply valve 406 in the open state until the pressure level error 1220 is less than a threshold value (e.g., 5 psi).

Figure 14:
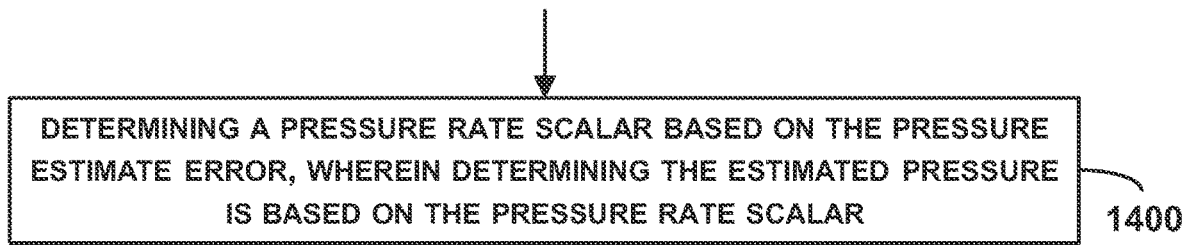
FIG. 14 is a flowchart of additional operations that are executable with the method of FIG. 13, in accordance with an example implementation.

FIG. 14 is a flowchart of additional operations that are executable with the method 1300, in accordance with an example implementation. At block 1400, the operations include determining the pressure rate scalar 1206 (e.g., a rate of change of pressure with respect to time in psi/second) based on the pressure estimate error 1212, wherein determining the estimated pressure 1209 is based on the pressure rate scalar 1206.

Figure 15:
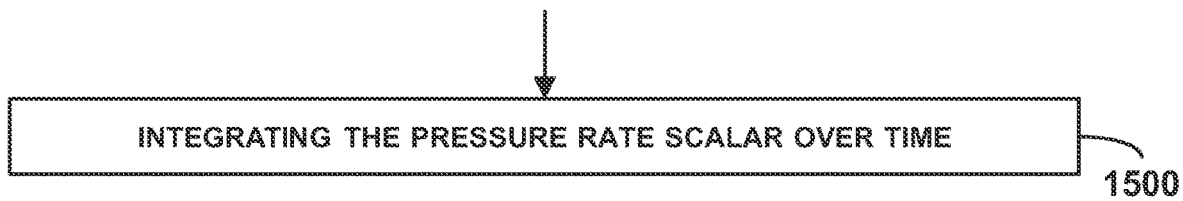
FIG. 15 is a flowchart of additional operations that are executable with the method FIG. 13, in accordance with an example implementation.

FIG. 15 is a flowchart of additional operations that are executable with the method 1300, in accordance with an example implementation. At block 1500, the operation of determining the pressure rate scalar 1206 based on the pressure estimate error 1212 include integrating the pressure rate scalar 1206 (e.g., at the integration block 1205). Integrating the pressure rate scalar 1206, which has units of pressure change per second (e.g., in psi/second) over time, results in the estimated pressure 12109 in pressure level units (e.g., psi).

Figure 16:
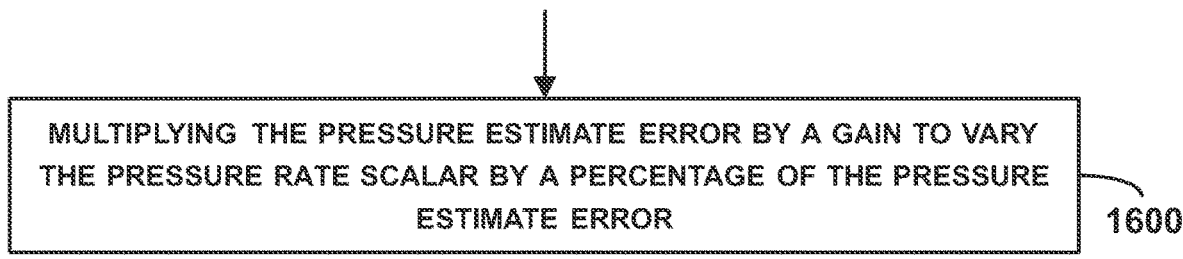
FIG. 16 is a flowchart of additional operations that are executable with the method FIG. 13, in accordance with an example implementation.

FIG. 16 is a flowchart of additional operations that are executable with the method 1300, in accordance with an example implementation. At block 1600, the operation determining the pressure rate scalar 1206 based on the pressure estimate error 1212 comprises multiplying the pressure estimate error 1212 by a gain (e.g., the gain $K_P$ at the gain block 1214) to vary the pressure rate scalar 1206 by a percentage of the pressure estimate error 1212.

FIG. 17 is a flowchart of additional operations that are executable with the method 1300, in accordance with an example implementation. The valve assembly 402 further comprises the pilot exhaust valve 408 having (i) the vent port 708B, (ii) the outlet port 706B that is fluidly coupled to the outlet port 706A of the pilot supply valve 406. At block 1700, the operations include, when the controller 428 operates the pilot supply valve 406 in the open state, operating the pilot exhaust valve 408 in a closed state to block fluid flow from the outlet port 706B to the vent port 708B to allow the pilot fluid signal to flow to the pilot port 1000 of the main valve 426 to actuate the main valve 426.

FIG. 18 is a flowchart of additional operations that are executable with the method 1300, in accordance with an example implementation. At block 1800, operating the pilot supply valve 406 in the open state comprises sending a signal to the solenoid coil 710A of the pilot supply valve 406 at the second frequency (e.g., at the 100 Hz frequency). However, as mentioned above, if the vehicle 100 includes more retractable axles, the controller 428 may send the signal to the pilot supply valve 406 at a third frequency (e.g., 33 Hz) that is greater than the first frequency but smaller than the second frequency.

FIG. 19 is a flowchart of additional operations that are executable with the method 1300, in accordance with an example implementation. At block 1900, the operations include generating the enable signal 1200 in response to operating the pilot supply valve 406 in the open state, wherein determining the estimated pressure 1209 is enabled based on the enable signal 1200 meeting an enablement criterion (e.g., having a value of 1 or a positive value).

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiment (EEEs) listed below.

EEE 1 is a control system comprising: a valve assembly comprising a pilot supply valve having (i) a valve inlet port configured to be fluidly coupled to a source of fluid, and (ii) an outlet port configured to be fluidly coupled to a pilot port of a main valve via a pilot line, wherein when the pilot supply valve is operating in an open state, a pilot fluid signal flows from the valve inlet port to the outlet port to actuate the main valve; and a controller configured to perform operations comprising: receiving, at a first frequency, sensor information indicative of an actual pressure level of the pilot fluid signal in the pilot line, determining an estimated pressure for the pilot fluid signal in the pilot line at a second frequency greater than the first frequency, determining a pressure estimate error based on comparing the actual pressure level to the estimated pressure, determining a pressure rate scalar based on the pressure estimate error, wherein determining the estimated pressure is based on the pressure rate scalar, determining a pressure level error based on comparing the estimated pressure to a commanded pressure value, and operating the pilot supply valve in the open state until the pressure level error is less than a threshold value.

EEE 2 is the control system of EEE 1, wherein determining the estimated pressure based on the pressure rate scalar comprises: integrating the pressure rate scalar over time.

EEE 3 is the control system of any of EEEs 1-2, wherein operating the pilot supply valve in the open state until the pressure level error is less than the threshold value comprises: implementing a closed-loop feedback controller that operates the pilot supply valve in the open state to reduce the pressure level error below the threshold value.

EEE 4 is the control system of any of EEEs 1-3, wherein determining the pressure rate scalar based on the pressure estimate error comprises: multiplying the pressure estimate error by a gain to vary the pressure rate scalar by a percentage of the pressure estimate error EEE 5 is the control system of any of EEEs 1-4, wherein the outlet port of the pilot supply valve is a first outlet port, wherein the valve assembly further comprises: a pilot exhaust valve having (i) a vent port, (ii) a second outlet port that is fluidly coupled to the first outlet port of the pilot supply valve, wherein when the controller operates the pilot supply valve in the open state, the controller operates the pilot exhaust valve in a closed state to block fluid flow from the second outlet port to the vent port to allow the pilot fluid signal to flow to the pilot port of the main valve to actuate the main valve.

EEE 6 is the control system of EEE 5, wherein the valve assembly further comprises: a mounting plate having an inlet port configured to be fluidly coupled to the source of fluid, wherein the pilot supply valve and the pilot exhaust valve are mounted to the mounting plate, such that the valve inlet port is fluidly coupled to the inlet port of the mounting plate.

EEE 7 is a vehicle comprising: a retractable axle; axle-lowering bags configured to lower the retractable axle of the vehicle when inflated; a source of fluid; a main valve comprising: (i) a supply port fluidly coupled to the source of fluid, (ii) a workport fluidly coupled to the axle-lowering bags, and (iii) a pilot port; a pilot supply valve having (i) a valve inlet port fluidly coupled to the source of fluid, and (ii) an outlet port, wherein when the pilot supply valve is operating in an open state, the outlet port is fluidly coupled to the valve inlet port and a pilot fluid signal flows from the valve inlet port to the outlet port; a pilot line fluidly coupling the outlet port of the pilot supply valve to the pilot port of the main valve; a pressure sensor coupled to the pilot line and configured to provide, at a first frequency, sensor information indicative of an actual pressure level of the pilot fluid signal in the pilot line; a vehicle control unit configured to receive the sensor information from the pressure sensor and generate a commanded pressure value for the pilot fluid signal; and a controller configured to perform operations comprising: (i) receiving the sensor information and the commanded pressure value from the vehicle control unit, (ii) determining an estimated pressure for the pilot fluid signal in the pilot line at a second frequency greater than the first frequency, (iii) determining a pressure estimate error based on comparing the actual pressure level to the estimated pressure, (iv) determining a pressure rate scalar based on the pressure estimate error, wherein determining the estimated pressure is based on the pressure rate scalar, (v) determining a pressure level error based on comparing the estimated pressure to the commanded pressure value, and (vi) operating the pilot supply valve in the open state until the pressure level error is less than a threshold value, thereby actuating the main valve, causing the supply port to be fluidly coupled to the workport and allowing the axle-lowering bags to be inflated.

EEE 8 is the vehicle of EEE 7, wherein determining the estimated pressure based on the pressure rate scalar comprises: integrating the pressure rate scalar over time.

EEE 9 is the vehicle of any of EEEs 7-8, wherein determining the pressure rate scalar based on the pressure estimate error comprises: multiplying the pressure estimate error by a gain to vary the pressure rate scalar by a percentage of the pressure estimate error.

EEE 10 is the vehicle of any of EEEs 7-9, wherein the outlet port of the pilot supply valve is a first outlet port, wherein the vehicle further comprises: a pilot exhaust valve having (i) a vent port, (ii) a second outlet port that is fluidly coupled to the first outlet port of the pilot supply valve, wherein when the controller operates the pilot supply valve in the open state, the controller operates the pilot exhaust valve in a closed state to block fluid flow from the second outlet port to the vent port to allow the pilot fluid signal to flow to the pilot port of the main valve and actuate the main valve.

EEE 11 is the vehicle of EEE 10, wherein the workport of the main valve is a first workport, wherein the vehicle further comprises: a reservoir of fluid; and axle-lifting bags configured to lift the retractable axle when inflated, wherein the main valve further comprises: (i) a reservoir port fluidly coupled to the reservoir of fluid, and (ii) a second workport configured to be fluidly coupled to the axle-lifting bags, wherein when the main valve is actuated, the reservoir port is fluidly coupled to the second workport, thereby causing the axle-lifting bags to be deflated.

EEE 12 is the vehicle of EEE 11, wherein the controller is further configured to perform operations comprising: operating the pilot supply valve in a respective closed state, blocking the pilot fluid signal; and operating the pilot exhaust valve in a respective open state, thereby (i) allowing fluid flow from the second outlet port to the vent port to drain the pilot port of the main valve, and (ii) causing the main valve to operate in an unactuated state at which the supply port is fluidly coupled to the second workport and the reservoir port is fluidly coupled to the first workport, allowing the axle-lifting bags to be inflated and the axle-lowering bags to be deflated.

EEE 13 is the vehicle of any of EEEs 10-12, further comprising: a mounting plate having an inlet port configured to be fluidly coupled to the source of fluid, wherein the pilot supply valve and the pilot exhaust valve are mounted to the mounting plate, such that the valve inlet port is fluidly coupled to the inlet port of the mounting plate.

EEE 14 is a method comprising: receiving, by a controller of a valve assembly, sensor information indicative of an actual pressure level of a pilot fluid signal in a pilot line, wherein the controller receives the sensor information at a first frequency, wherein the valve assembly comprising a pilot supply valve having (i) a valve inlet port configured to be fluidly coupled to a source of fluid, and (ii) an outlet port configured to be fluidly coupled to a pilot port of a main valve via the pilot line, wherein when the pilot supply valve is operating in an open state, the pilot fluid signal flows from the valve inlet port to the outlet port to actuate the main valve; determining an estimated pressure for the pilot fluid signal in the pilot line at a second frequency greater than the first frequency; determining a pressure estimate error based on comparing the actual pressure level to the estimated pressure; determining a pressure level error based on comparing the estimated pressure to a commanded pressure value; and operating the pilot supply valve in the open state until the pressure level error is less than a threshold value.

EEE 15 is the method of EEE 14, further comprising: determining a pressure rate scalar based on the pressure estimate error, wherein determining the estimated pressure is based on the pressure rate scalar.

EEE 16 is the method of EEE 15, wherein determining the estimated pressure based on the pressure rate scalar comprises: integrating the pressure rate scalar over time.

EEE 17 is the method of any of EEEs 15-16, wherein determining the pressure rate scalar based on the pressure estimate error comprises: multiplying the pressure estimate error by a gain to vary the pressure rate scalar by a percentage of the pressure estimate error.

EEE 18 is the method of any of EEEs 14-17, wherein the outlet port of the pilot supply valve is a first outlet port, wherein the valve assembly further comprises a pilot exhaust valve having (i) a vent port, (ii) a second outlet port that is fluidly coupled to the first outlet port of the pilot supply valve, wherein the method further comprises: the controller operates the pilot supply valve in the open state, operating the pilot exhaust valve in a closed state to block fluid flow from the second outlet port to the vent port to allow the pilot fluid signal to flow to the pilot port of the main valve to actuate the main valve.

EEE 19 is the method of any of EEEs 14-18, wherein operating the pilot supply valve in the open state comprises: sending a signal to a solenoid coil of the pilot supply valve at the second frequency.

EEE 20 is the method of any of EEEs 14-19, further comprising: generating an enable signal in response to operating the pilot supply valve in the open state, wherein determining the estimated pressure is enabled based on the enable signal meeting an enablement criterion.

What is claimed is:

1. A control system comprising:
a valve assembly comprising a pilot supply valve having
(i) a valve inlet port configured to be fluidly coupled to a source of fluid, and (ii) an outlet port configured to be fluidly coupled to a pilot port of a main valve via a pilot line, wherein when the pilot supply valve is operating in an open state, a pilot fluid signal flows from the valve inlet port to the outlet port to actuate the main valve; and
a controller configured to perform operations comprising:
receiving, at a first frequency, sensor information indicative of an actual pressure level of the pilot fluid signal in the pilot line,
determining an estimated pressure for the pilot fluid signal in the pilot line at a second frequency greater than the first frequency,
determining a pressure estimate error based on comparing the actual pressure level to the estimated pressure,
determining a pressure rate scalar based on the pressure estimate error, wherein determining the estimated pressure is based on the pressure rate scalar,
determining a pressure level error based on comparing the estimated pressure to a commanded pressure value, and
operating the pilot supply valve in the open state until the pressure level error is less than a threshold value.

2. The control system of claim 1, wherein determining the estimated pressure based on the pressure rate scalar comprises:
integrating the pressure rate scalar over time.

3. The control system of claim 1, wherein operating the pilot supply valve in the open state until the pressure level error is less than the threshold value comprises:
implementing a closed-loop feedback controller that operates the pilot supply valve in the open state to reduce the pressure level error below the threshold value.

4. The control system of claim 1, wherein determining the pressure rate scalar based on the pressure estimate error comprises:
multiplying the pressure estimate error by a gain to vary the pressure rate scalar by a percentage of the pressure estimate error.

5. The control system of claim 1, wherein the outlet port of the pilot supply valve is a first outlet port, wherein the valve assembly further comprises: a pilot exhaust valve having (i) a vent port, (ii) a second outlet port that is fluidly coupled to the first outlet port of the pilot supply valve, wherein when the controller operates the pilot supply valve in the open state, the controller operates the pilot exhaust valve in a closed state to block fluid flow from the second outlet port to the vent port to allow the pilot fluid signal to flow to the pilot port of the main valve to actuate the main valve.

6. The control system of claim 5, wherein the valve assembly further comprises:
a mounting plate having an inlet port configured to be fluidly coupled to the source of fluid, wherein the pilot supply valve and the pilot exhaust valve are mounted to the mounting plate, such that the valve inlet port is fluidly coupled to the inlet port of the mounting plate.

7. A vehicle comprising:
a retractable axle;
axle-lowering bags configured to lower the retractable axle of the vehicle when inflated;
a source of fluid;
a main valve comprising: (i) a supply port fluidly coupled to the source of fluid, (ii) a workport fluidly coupled to the axle-lowering bags, and (iii) a pilot port;
a pilot supply valve having (i) a valve inlet port fluidly coupled to the source of fluid, and (ii) an outlet port, wherein when the pilot supply valve is operating in an open state, the outlet port is fluidly coupled to the valve inlet port and a pilot fluid signal flows from the valve inlet port to the outlet port;

a pilot line fluidly coupling the outlet port of the pilot supply valve to the pilot port of the main valve;

a pressure sensor coupled to the pilot line and configured to provide, at a first frequency, sensor information indicative of an actual pressure level of the pilot fluid signal in the pilot line;

a vehicle control unit configured to receive the sensor information from the pressure sensor and generate a commanded pressure value for the pilot fluid signal; and a controller configured to perform operations comprising: (i) receiving the sensor information and the commanded pressure value from the vehicle control unit, (ii) determining an estimated pressure for the pilot fluid signal in the pilot line at a second frequency greater than the first frequency, (iii) determining a pressure estimate error based on comparing the actual pressure level to the estimated pressure, (iv) determining a pressure rate scalar based on the pressure estimate error, wherein determining the estimated pressure is based on the pressure rate scalar, (v) determining a pressure level error based on comparing the estimated pressure to the commanded pressure value, and (vi) operating the pilot supply valve in the open state until the pressure level error is less than a threshold value, thereby actuating the main valve, causing the supply port to be fluidly coupled to the workport and allowing the axle-lowering bags to be inflated.

8. The vehicle of claim 7, wherein determining the estimated pressure based on the pressure rate scalar comprises:
integrating the pressure rate scalar over time.

9. The vehicle of claim 7, wherein determining the pressure rate scalar based on the pressure estimate error comprises:
multiplying the pressure estimate error by a gain to vary the pressure rate scalar by a percentage of the pressure estimate error.

10. The vehicle of claim 7, wherein the outlet port of the pilot supply valve is a first outlet port, wherein the vehicle further comprises:
a pilot exhaust valve having (i) a vent port, (ii) a second outlet port that is fluidly coupled to the first outlet port of the pilot supply valve, wherein when the controller operates the pilot supply valve in the open state, the controller operates the pilot exhaust valve in a closed state to block fluid flow from the second outlet port to the vent port to allow the pilot fluid signal to flow to the pilot port of the main valve and actuate the main valve.

11. The vehicle of claim 10, wherein the workport of the main valve is a first workport, wherein the vehicle further comprises:
a reservoir of fluid; and
axle-lifting bags configured to lift the retractable axle when inflated, wherein the main valve further comprises: (i) a reservoir port fluidly coupled to the reservoir of fluid, and (ii) a second workport configured to be fluidly coupled to the axle-lifting bags, wherein when the main valve is actuated, the reservoir port is fluidly coupled to the second workport, thereby causing the axle-lifting bags to be deflated.

12. The vehicle of claim 11, wherein the controller is further configured to perform operations comprising:

operating the pilot supply valve in a respective closed state, blocking the pilot fluid signal; and operating the pilot exhaust valve in a respective open state, thereby (i) allowing fluid flow from the second outlet port to the vent port to drain the pilot port of the main valve, and (ii) causing the main valve to operate in an unactuated state at which the supply port is fluidly coupled to the second workport and the reservoir port is fluidly coupled to the first workport, allowing the axle-lifting bags to be inflated and the axle-lowering bags to be deflated.

13. The vehicle of claim 10, further comprising:
a mounting plate having an inlet port configured to be fluidly coupled to the source of fluid, wherein the pilot supply valve and the pilot exhaust valve are mounted to the mounting plate, such that the valve inlet port is fluidly coupled to the inlet port of the mounting plate.

14. A method comprising:
receiving, by a controller of a valve assembly, sensor information indicative of an actual pressure level of a pilot fluid signal in a pilot line, wherein the controller receives the sensor information at a first frequency, wherein the valve assembly comprising a pilot supply valve having (i) a valve inlet port configured to be fluidly coupled to a source of fluid, and (ii) an outlet port configured to be fluidly coupled to a pilot port of a main valve via the pilot line, wherein when the pilot supply valve is operating in an open state, the pilot fluid signal flows from the valve inlet port to the outlet port to actuate the main valve;

determining an estimated pressure for the pilot fluid signal in the pilot line at a second frequency greater than the first frequency;

determining a pressure estimate error based on comparing the actual pressure level to the estimated pressure;

determining a pressure level error based on comparing the estimated pressure to a commanded pressure value; and operating the pilot supply valve in the open state until the pressure level error is less than a threshold value.

15. The method of claim 14, further comprising:
determining a pressure rate scalar based on the pressure estimate error, wherein determining the estimated pressure is based on the pressure rate scalar.

16. The method of claim 15, wherein determining the estimated pressure based on the pressure rate scalar comprises:
integrating the pressure rate scalar over time.

17. The method of claim 15, wherein determining the pressure rate scalar based on the pressure estimate error comprises:
multiplying the pressure estimate error by a gain to vary the pressure rate scalar by a percentage of the pressure estimate error.

18. The method of claim 14, wherein the outlet port of the pilot supply valve is a first outlet port, wherein the valve assembly further comprises a pilot exhaust valve having (i) a vent port, (ii) a second outlet port that is fluidly coupled to the first outlet port of the pilot supply valve, wherein the method further comprises:
the controller operates the pilot supply valve in the open state, operating the pilot exhaust valve in a closed state to block fluid flow from the second outlet port to the vent port to allow the pilot fluid signal to flow to the pilot port of the main valve to actuate the main valve.

19. The method of claim 14, wherein operating the pilot supply valve in the open state comprises:

sending a signal to a solenoid coil of the pilot supply valve at the second frequency.

20. The method of claim 14, further comprising:
generating an enable signal in response to operating the pilot supply valve in the open state, wherein determining the estimated pressure is enabled based on the enable signal meeting an enablement criterion.

* * * * *